US011234180B2

United States Patent
Lee et al.

(10) Patent No.: US 11,234,180 B2
(45) Date of Patent: Jan. 25, 2022

(54) MOBILITY PROCEDURES WITH HIERARCHICAL MOBILITY

(71) Applicant: QUALCOMM Incorporated, San Diego, CA (US)

(72) Inventors: Heechoon Lee, San Diego, CA (US); Hung Dinh Ly, San Diego, CA (US); Gavin Bernard Horn, La Jolla, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 16/732,207

(22) Filed: Dec. 31, 2019

(65) Prior Publication Data

US 2020/0221363 A1 Jul. 9, 2020

Related U.S. Application Data

(60) Provisional application No. 62/788,031, filed on Jan. 3, 2019.

(51) Int. Cl.
*H04W 36/32* (2009.01)
*H04W 76/30* (2018.01)
(Continued)

(52) U.S. Cl.
CPC ............ *H04W 36/32* (2013.01); *H04W 8/02* (2013.01); *H04W 56/001* (2013.01);
(Continued)

(58) Field of Classification Search
CPC . H04W 36/08; H04W 36/30; H04W 36/0083; H04W 36/04; H04W 36/0061;
(Continued)

(56) References Cited

U.S. PATENT DOCUMENTS 9,872,220 B2 * 1/2018 Jang ...................... H04W 48/20
9,930,568 B2 * 3/2018 Murray ................. H04W 28/04
(Continued)

FOREIGN PATENT DOCUMENTS

WO  WO-2018017840 A1   1/2018
WO  WO-2018114258 A1   6/2018
(Continued)

OTHER PUBLICATIONS

Partial International Search Report—PCT/US2020/012084—ISAEPO—dated Apr. 24, 2020.
(Continued)

*Primary Examiner* — Wutchung Chu
(74) *Attorney, Agent, or Firm* — Holland & Hart

(57) ABSTRACT

Techniques are described herein for mobility procedures configured to maintain connectivity with a device, such as a user equipment (UE), when the UE moves between single-frequency network (SFN) areas. When the UE operates in a radio resource control (RRC) inactive state or an RRC idle state, the UE may utilize hierarchical mobility. As the UE moves throughout the coverage area of the network, the UE may use mobility procedures for moving between a serving radio access network (RAN) notification area (RNA) and a neighboring RNA (e.g., inter-RNA procedures), and/or procedures for moving between SFN areas within the serving RNA (e.g., intra-RNA procedures), which may include procedures for moving between tracking areas (TAs). In some mobility procedures, the UE may skip decoding a system information block. In some mobility procedures, the UE may skip reading the system information. An SFN area may be a radio access network area code (RAN-AC).

30 Claims, 21 Drawing Sheets

(51) Int. Cl.
H04W 76/27 (2018.01)
H04W 8/02 (2009.01)
H04W 56/00 (2009.01)
H04W 68/02 (2009.01)
H04W 74/08 (2009.01)

(52) U.S. Cl.
CPC ....... H04W 68/02 (2013.01); H04W 74/0833 (2013.01); H04W 76/27 (2018.02); H04W 76/30 (2018.02)

(58) Field of Classification Search
CPC . H04W 36/0085; H04W 36/14; H04W 36/24; H04W 36/0072; H04W 36/0058; H04W 36/00835; H04W 36/32; H04W 56/001; H04W 68/00; H04W 68/02; H04W 74/0833; H04W 76/27; H04W 8/02; H04W 48/12; H04W 48/16; H04W 60/04; H04W 76/30; H04W 4/06; H04W 76/16; H04W 72/005; H04W 76/002; H04W 76/38; H04W 36/0007; H04W 76/25; H04W 24/10; H04W 76/19; H04W 76/00; H04W 76/50; H04W 36/026; H04W 48/06; H04W 36/0069; H04W 36/06; H04W 36/0022; H04W 4/40; H04W 24/02; H04W 68/005; H04W 76/18; H04W 28/02; H04W 48/18; H04W 72/04; H04W 36/0055; H04W 48/08; H04W 76/15
See application file for complete search history.

(56) References Cited

U.S. PATENT DOCUMENTS

| | | | | |
|---|---|---|---|---|
| 10,763,947 B2 * | 9/2020 | Kim | .................. | H04B 7/088 |
| 2011/0216732 A1 * | 9/2011 | Maeda | ................. | H04W 72/04 |
| | | | | 370/329 |
| 2012/0243417 A1 * | 9/2012 | Henttonen | ...... | H04W 36/00837 |
| | | | | 370/241 |
| 2012/0258750 A1 * | 10/2012 | Kim | ................. | H04W 36/0083 |
| | | | | 455/509 |
| 2013/0039339 A1 * | 2/2013 | Rayavarapu | ......... | H04W 76/19 |
| | | | | 370/331 |
| 2014/0086208 A1 * | 3/2014 | Murray | ................. | H04W 36/08 |
| | | | | 370/331 |
| 2014/0179320 A1 * | 6/2014 | Jang | ..................... | H04W 48/20 |
| | | | | 455/436 |
| 2014/0241180 A1 * | 8/2014 | Amerga | ............ | H04W 36/0007 |
| | | | | 370/252 |
| 2015/0011216 A1 * | 1/2015 | Jung | ................. | H04W 36/0072 |
| | | | | 455/436 |
| 2017/0013518 A1 * | 1/2017 | Kilgour | ............. | H04W 36/0066 |
| 2018/0206080 A1 * | 7/2018 | Chen | ....................... | H04W 4/50 |
| 2018/0324667 A1 * | 11/2018 | Dong | .................... | H04W 48/10 |
| 2019/0037635 A1 * | 1/2019 | Guo | ....................... | H04W 76/19 |
| 2019/0174382 A1 * | 6/2019 | Yu | ......................... | H04W 76/27 |
| 2019/0191338 A1 * | 6/2019 | Yu | ......................... | H04W 36/02 |
| 2019/0223095 A1 * | 7/2019 | Yu | ......................... | H04W 76/11 |
| 2019/0394693 A1 * | 12/2019 | Kim | ...................... | H04W 88/06 |
| 2020/0015196 A1 * | 1/2020 | Sivavakeesar | .... | H04W 36/0055 |
| 2020/0036430 A1 * | 1/2020 | Kim | .................. | H04W 74/0833 |
| 2020/0045690 A1 * | 2/2020 | Martin | .............. | H04W 36/0094 |
| 2020/0280959 A1 * | 9/2020 | Sharma | ............... | H04W 68/025 |
| 2020/0389868 A1 * | 12/2020 | Martin | ................. | H04W 68/02 |
| 2021/0076264 A1 * | 3/2021 | Zhang | ............. | H04W 36/00835 |

FOREIGN PATENT DOCUMENTS

| | | |
|---|---|---|
| WO | WO-2018130366 A1 | 7/2018 |
| WO | WO-2018143713 A1 | 8/2018 |
| WO | WO-2020018464 A1 | 1/2020 |

OTHER PUBLICATIONS

VIVO: "Discussion on RAN based Notification Area Update", 3GPP Draft, 3GPP TSG-RAN wg2 Nr Ad Hoc, R2-1700041_ Discussion on RAN based Notification Area Update, 3rd Generation Partnership Project (3GPP), Mobile Competence Centre, 650, Route Des Lucioles, F-06921 Sophia-Antipolis Cedex, vol. RAN WG2, No. Spokane, USA, Jan. 17, 2017-Jan. 19, 2017, Jan. 7, 2017 (Jan. 7, 2017), XP051203829, 3 Pages, Retrieved from the Internet: URL: http://www.3gpp.org/ftp/tsg_ran/WG2_RL2/TSGR2_AHs/2017_01_NR/Docs/, [retrieved on Jan. 7, 2017], the whole document.

International Search Report and Written Opinion—PCT/US2020/012084—ISA/EPO—dated Jul. 1, 2020.

ZTE, et al., "Consideration on the RAN Based Notification in RRC Inactive", 3GPP TSG-RAN WG2 NR Ad Hoc, 3GPP Draft; R2-1700277 Consideration on the RAN based Notification in RRC_Inactive, 3rd Generation Partnership Project (3GPP), Mobile Competence Centre; 650, Route Des Lucioles; F-06921, Sophia-Antipolis, vol. RAN WG2, No. Spokane, USA; Jan. 17, 2017-Jan. 19, 2017, Jan. 17, 2017 (Jan. 17, 2017), 7 Pages, XP051210859, Retrieved from the Internet: URL: http://www.3gpp.org/ftp/Meetings_3GPP_SYNC/RAN2/Docs/ [retrieved on Jan. 17, 2017] the whole document.

* cited by examiner

MOBILITY PROCEDURES WITH HIERARCHICAL MOBILITY

CROSS REFERENCE

The present application for patent claims the benefit of U.S. Provisional Patent Application No. 62/788,031 by LEE et al., entitled "MOBILITY PROCEDURES WITH HIERARCHICAL MOBILITY," filed Jan. 3, 2019, assigned to the assignee hereof, and expressly incorporated by reference herein.

BACKGROUND

The following relates generally to wireless communications, and more specifically to mobility procedures with hierarchical mobility.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communication systems may use directional beams to communicate some information. Because directional beams serve a limited geographic coverage area, some signals may be transmitted over multiple beams in a beam-sweeping pattern. Such beam-sweeping may use more communication resources than omnidirectional communications.

SUMMARY

The described techniques relate to improved methods, systems, devices, and apparatuses that support mobility procedures with hierarchical mobility. Generally, the described techniques provide for mobility procedures configured to maintain connectivity with a device, such as a user equipment (UE), when the device moves between single-frequency network (SFN) areas. When a UE operates in a radio resource control (RRC) inactive state or an RRC idle state, the UE may utilize hierarchical mobility. As the UE moves throughout the coverage area of the network, the UE may use mobility procedures for moving between a serving radio access network (RAN) notification area (RNA) and a neighboring RNA (e.g., inter-RNA procedures), and/or procedures for moving between SFN areas within the serving RNA (e.g., intra-RNA procedures), which may include procedures for moving between tracking areas (TAs). In some mobility procedures, the UE may skip decoding a system information block. In some mobility procedures, the UE may skip reading system information. An SFN area may be a radio access network area code (RAN-AC) in some cases.

A method of wireless communication is described. The method may include identifying, by a user equipment operating in a radio resource control inactive state or a radio resource control idle state, one or more single-frequency network synchronization signals or one or more single-frequency network paging signals associated with a first single-frequency network area, determining whether a reselection condition is satisfied based on identifying the one or more single-frequency network synchronization signals or the one or more single-frequency network paging signals, selecting a second single-frequency network area based on determining whether the reselection condition is satisfied, and performing, based on selecting the second single-frequency network area, an area reselection procedure to associate the user equipment with the second single-frequency network area.

An apparatus for wireless communication is described. The apparatus may include a processor, memory in electronic communication with the processor, and instructions stored in the memory. The instructions may be executable by the processor to cause the apparatus to identify, by a user equipment operating in a radio resource control inactive state or a radio resource control idle state, one or more single-frequency network synchronization signals or one or more single-frequency network paging signals associated with a first single-frequency network area, determine whether a reselection condition is satisfied based on identifying the one or more single-frequency network synchronization signals or the one or more single-frequency network paging signals, select a second single-frequency network area based on determining whether the reselection condition is satisfied, and perform, based on selecting the second single-frequency network area, an area reselection procedure to associate the user equipment with the second single-frequency network area.

Another apparatus for wireless communication is described. The apparatus may include means for identifying, by a user equipment operating in a radio resource control inactive state or a radio resource control idle state, one or more single-frequency network synchronization signals or one or more single-frequency network paging signals associated with a first single-frequency network area, determining whether a reselection condition is satisfied based on identifying the one or more single-frequency network synchronization signals or the one or more single-frequency network paging signals, selecting a second single-frequency network area based on determining whether the reselection condition is satisfied, and performing, based on selecting the second single-frequency network area, an area reselection procedure to associate the user equipment with the second single-frequency network area.

A non-transitory computer-readable medium storing code for wireless communication is described. The code may include instructions executable by a processor to identify, by a user equipment operating in a radio resource control inactive state or a radio resource control idle state, one or more single-frequency network synchronization signals or one or more single-frequency network paging signals associated with a first single-frequency network area, determine whether a reselection condition is satisfied based on identifying the one or more single-frequency network synchronization signals or the one or more single-frequency network paging signals, select a second single-frequency network area based on determining whether the reselection condition is satisfied, and perform, based on selecting the second single-frequency network area, an area reselection procedure to associate the user equipment with the second single-frequency network area.

Some examples of the method, apparatuses, and non-transitory computer-readable medium described herein may further include operations, features, means, or instructions for determining, based on selecting the second single-frequency network area, that the second single-frequency network area may be not included in a serving radio access network based notification area associated with the first single-frequency network area, where performing the area reselection procedure may be based on determining that the second single-frequency network area may be not included in the serving radio access network based notification area.

Some examples of the method, apparatuses, and non-transitory computer-readable medium described herein may further include operations, features, means, or instructions for monitoring for one or more primary synchronization signals or one or more secondary synchronization signal associated with the second single-frequency network area based on determining that the second single-frequency network area may be not included in the serving radio access network based notification area, and decoding a master information block associated with a cell of the second single-frequency network area, where performing the area reselection procedure may be based on decoding the master information block.

In some examples of the method, apparatuses, and non-transitory computer-readable medium described herein, the area reselection procedure may be performed without decoding a system information type 1 block.

In some examples of the method, apparatuses, and non-transitory computer-readable medium described herein, the area reselection procedure may be performed with decoding a system information type 1 block.

In some examples of the method, apparatuses, and non-transitory computer-readable medium described herein, performing the area reselection procedure further may include operations, features, means, or instructions for performing a random access channel procedure based on the user equipment being in a radio resource control connected state.

Some examples of the method, apparatuses, and non-transitory computer-readable medium described herein may further include operations, features, means, or instructions for entering, by the user equipment, the radio resource control connected state based on determining that the second single-frequency network area may be not included in the serving radio access network based notification area, where performing the random access channel procedure may be based on entering the radio resource control connected state.

In some examples of the method, apparatuses, and non-transitory computer-readable medium described herein, the first single-frequency network area includes a first radio access network area code, a first group of cells defined by a network entity, a first tracking area, or any combination thereof, and the second single-frequency network area includes a second radio access network area code, a second group of cells defined by the network entity, a second tracking area, or any combination thereof.

In some examples of the method, apparatuses, and non-transitory computer-readable medium described herein, the first single-frequency network area and the second single-frequency network area may be within a single radio access network notification area.

Some examples of the method, apparatuses, and non-transitory computer-readable medium described herein may further include operations, features, means, or instructions for determining, based on selecting the second single-frequency network area, that the second single-frequency network area may be included in a serving radio access network based notification area associated with the first single-frequency network area, where performing the area reselection procedure may be based on determining that the second single-frequency network area may be included in the serving radio access network based notification area.

Some examples of the method, apparatuses, and non-transitory computer-readable medium described herein may further include operations, features, means, or instructions for receiving a radio resource control connection release message that indicates a set of at least one single-frequency network area included in the serving radio access network based notification area, and comparing an identifier of the second single-frequency network area with at least a portion of the set indicated by the radio resource control connection release message, where determining that the second single-frequency network area may be included in the serving radio access network based notification area may be based on comparing the identifier of the second single-frequency network area with at least the portion of the set.

In some examples of the method, apparatuses, and non-transitory computer-readable medium described herein, the area reselection procedure may be performed without reading system information.

Some examples of the method, apparatuses, and non-transitory computer-readable medium described herein may further include operations, features, means, or instructions for receiving a radio resource control connection release message that indicates a search space configuration for the one or more single-frequency network paging signals, where monitoring for the one or more single-frequency network paging signals may be based on the search space configuration.

Some examples of the method, apparatuses, and non-transitory computer-readable medium described herein may further include operations, features, means, or instructions for determining an identifier of the second single-frequency network area based on the radio resource control connection release message, and identifying a period for monitoring the one or more single-frequency network paging signals based on the identifier of the second single-frequency network area.

Some examples of the method, apparatuses, and non-transitory computer-readable medium described herein may further include operations, features, means, or instructions for determining, based on selecting the second single-frequency network area, whether the second single-frequency network area may be included in a serving radio access network based notification area with the first single-frequency network area, where performing the area reselection procedure may be based on determining whether the second single-frequency network area may be included in the serving radio access network based notification area.

Some examples of the method, apparatuses, and non-transitory computer-readable medium described herein may further include operations, features, means, or instructions for receiving a radio resource control connection release message that indicates a set of a least one single-frequency network area included in the serving radio access network based notification area, entering the radio resource control inactive state based on receiving the radio resource control connection release message, and comparing an identifier of the second single-frequency network area with at least a portion of the set indicated by the radio resource control connection release message, where determining whether the second single-frequency network area may be included in the serving radio access network based notification area may be based on comparing the identifier of the second single-frequency network area with at least the portion of the set.

Some examples of the method, apparatuses, and non-transitory computer-readable medium described herein may further include operations, features, means, or instructions for receiving a radio resource control connection release message that indicates that the area reselection procedure may be performed without reading system information.

Some examples of the method, apparatuses, and non-transitory computer-readable medium described herein may further include operations, features, means, or instructions for measuring a first signal strength of the one or more single-frequency network synchronization signals associated with the first single-frequency network area, and measuring a second signal strength of one or more single-frequency network synchronization signals associated with the second single-frequency network area, where determining whether the reselection condition may be satisfied may be based on the first signal strength and the second signal strength.

Some examples of the method, apparatuses, and non-transitory computer-readable medium described herein may further include operations, features, means, or instructions for identifying a serving cell associated with a serving radio access network notification area, where identifying the one or more single-frequency network synchronization signals or the one or more single-frequency network paging signals associated with the first single-frequency network area may be based on identifying the serving cell.

Some examples of the method, apparatuses, and non-transitory computer-readable medium described herein may further include operations, features, means, or instructions for switching from monitoring for signals associated with the first single-frequency network area to monitoring for signals associated with a serving cell, where determining whether the reselection condition may be satisfied may be based on switching from monitoring for signals associated with the first single-frequency network area to monitoring for signals associated with the serving cell.

Some examples of the method, apparatuses, and non-transitory computer-readable medium described herein may further include operations, features, means, or instructions for switching from monitoring for signals associated with a serving cell to monitoring for signals associated with the first single-frequency network area, where determining whether the reselection condition may be satisfied may be based on switching from monitoring for signals associated with the serving cell to monitoring for signals associated with the first single-frequency network area.

Some examples of the method, apparatuses, and non-transitory computer-readable medium described herein may further include operations, features, means, or instructions for determining, based on selecting the second single-frequency network area, that the second single-frequency network area may be included in a target radio access network based notification area different than a serving radio access network based notification area associated with the first single-frequency network area, where performing the area reselection procedure may be based on determining that the second single-frequency network area may be included in the target radio access network based notification area.

A method of wireless communication is described. The method may include identifying a single-frequency network area associated with a user equipment operating in a radio resource control inactive state or a radio resource control idle state, identifying a service class of the user equipment, selecting whether an area reselection procedure includes instructions for decoding a system information block based on the single-frequency network area and the service class of the user equipment, and transmitting, by a base station, a radio resource control connection release message that indicates whether the area reselection procedure includes decoding the system information block.

An apparatus for wireless communication is described. The apparatus may include a processor, memory in electronic communication with the processor, and instructions stored in the memory. The instructions may be executable by the processor to cause the apparatus to identify a single-frequency network area associated with a user equipment operating in a radio resource control inactive state or a radio resource control idle state, identify a service class of the user equipment, select whether an area reselection procedure includes instructions for decoding a system information block based on the single-frequency network area and the service class of the user equipment, and transmit, by a base station, a radio resource control connection release message that indicates whether the area reselection procedure includes decoding the system information block.

Another apparatus for wireless communication is described. The apparatus may include means for identifying a single-frequency network area associated with a user equipment operating in a radio resource control inactive state or a radio resource control idle state, identifying a service class of the user equipment, selecting whether an area reselection procedure includes instructions for decoding a system information block based on the single-frequency network area and the service class of the user equipment, and transmitting, by a base station, a radio resource control connection release message that indicates whether the area reselection procedure includes decoding the system information block.

A non-transitory computer-readable medium storing code for wireless communication is described. The code may include instructions executable by a processor to identify a single-frequency network area associated with a user equipment operating in a radio resource control inactive state or a radio resource control idle state, identify a service class of the user equipment, select whether an area reselection procedure includes instructions for decoding a system information block based on the single-frequency network area and the service class of the user equipment, and transmit, by a base station, a radio resource control connection release message that indicates whether the area reselection procedure includes decoding the system information block.

In some examples of the method, apparatuses, and non-transitory computer-readable medium described herein, the radio resource control connection release message indicates that the area reselection procedure may be performed without reading system information.

Some examples of the method, apparatuses, and non-transitory computer-readable medium described herein may further include operations, features, means, or instructions for transmitting, by the base station, one or more single-frequency network synchronization signals or one or more single-frequency network paging signals within the single-frequency network area based on the single-frequency network area.

In some examples of the method, apparatuses, and non-transitory computer-readable medium described herein, the radio resource control connection release message further indicates a set of at least one radio access network area code included in a serving radio access network based notification area associated with the user equipment, where transmitting the one or more single-frequency network synchronization signals or the one or more single-frequency network paging signals may be based on the radio resource control connection release message including the set.

In some examples of the method, apparatuses, and non-transitory computer-readable medium described herein, the radio resource control connection release message further indicates a search space configuration for the one or more single-frequency network paging signals associated with the single-frequency network area, where transmitting the one or more single-frequency network paging signals may be based on the radio resource control connection release message including the search space configuration.

In some examples of the method, apparatuses, and non-transitory computer-readable medium described herein, the service class of the user equipment includes a performance requirement associated with a signal communicated with the user equipment, a data rate of the signal communicated with the user equipment, a mobility of the user equipment, a latency requirement associated with the signal communicated with the user equipment, a reliability parameter associated with the signal communicated with the user equipment, or a combination thereof.

In some examples of the method, apparatuses, and non-transitory computer-readable medium described herein, the system information block includes a system information type 1 block.

In some examples of the method, apparatuses, and non-transitory computer-readable medium described herein, the single-frequency network area includes a radio access network area code, a group of cells defined by a network entity, a tracking area, or any combination thereof.

DETAILED DESCRIPTION

Some wireless communication systems may use directional beams transmitted in a beam-sweeping pattern to communicate some information. Beam sweeping may be used to account for the limited geographic area covered by each individual directional beam. Beam-sweeping, however, may use more communication resources than omnidirectional communications, in some cases. For example, when a user equipment (UE) is operating in a radio resource control (RRC) inactive state or an RRC idle state, a base station may transmit one or more signals, such as synchronization signals and/or paging signals, to the UE. Such signaling may use more communication resources when done using directional beams and beam-sweeping.

Some wireless communication systems may use hierarchical mobility to reduce the amount of communication resources used for communicating synchronization signals and/or paging signals to a device, such as a UE, when the UE is operating in the RRC inactive state or RRC idle state. In hierarchal mobility, a wireless communication system may be configured with a plurality of areas in which one or more single-frequency networks (SFNs) are established for communicating certain types of signals. Examples of the areas that may be used to establish SFNs may include a tracking area (TA), a radio access network (RAN) area code (RAN-AC), a RAN based notification area (RNA), or a combination thereof. A signal, such as synchronization signal or a paging signal, may be transmitted using a first set of communication resources in a first area, while the synchronization signal or the paging signal may be transmitted using a second set of communication resources in a second area that is different than (e.g., neighbors) the first area. In this manner, SFNs may be employed without interfering with neighboring transmissions.

Techniques are described herein for mobility procedures configured to maintain UE connectivity when the UE moves between SFN areas. The mobility procedures may include procedures for moving between a serving RNA and a neighboring RNA (e.g., inter-RNA procedures), and/or procedures for moving between network areas within the serving RNA (e.g., intra-RNA procedures), which may include procedures for moving between TAs. In some mobility procedures, the UE may skip decoding a system information block. In some mobility procedures, the UE may skip reading the system information.

Aspects of the disclosure are initially described in the context of a wireless communications systems and process flows. Aspects of the disclosure are further illustrated by and described with reference to apparatus diagrams, system diagrams, and flowcharts that relate to mobility procedures with hierarchical mobility.

Figure 1:
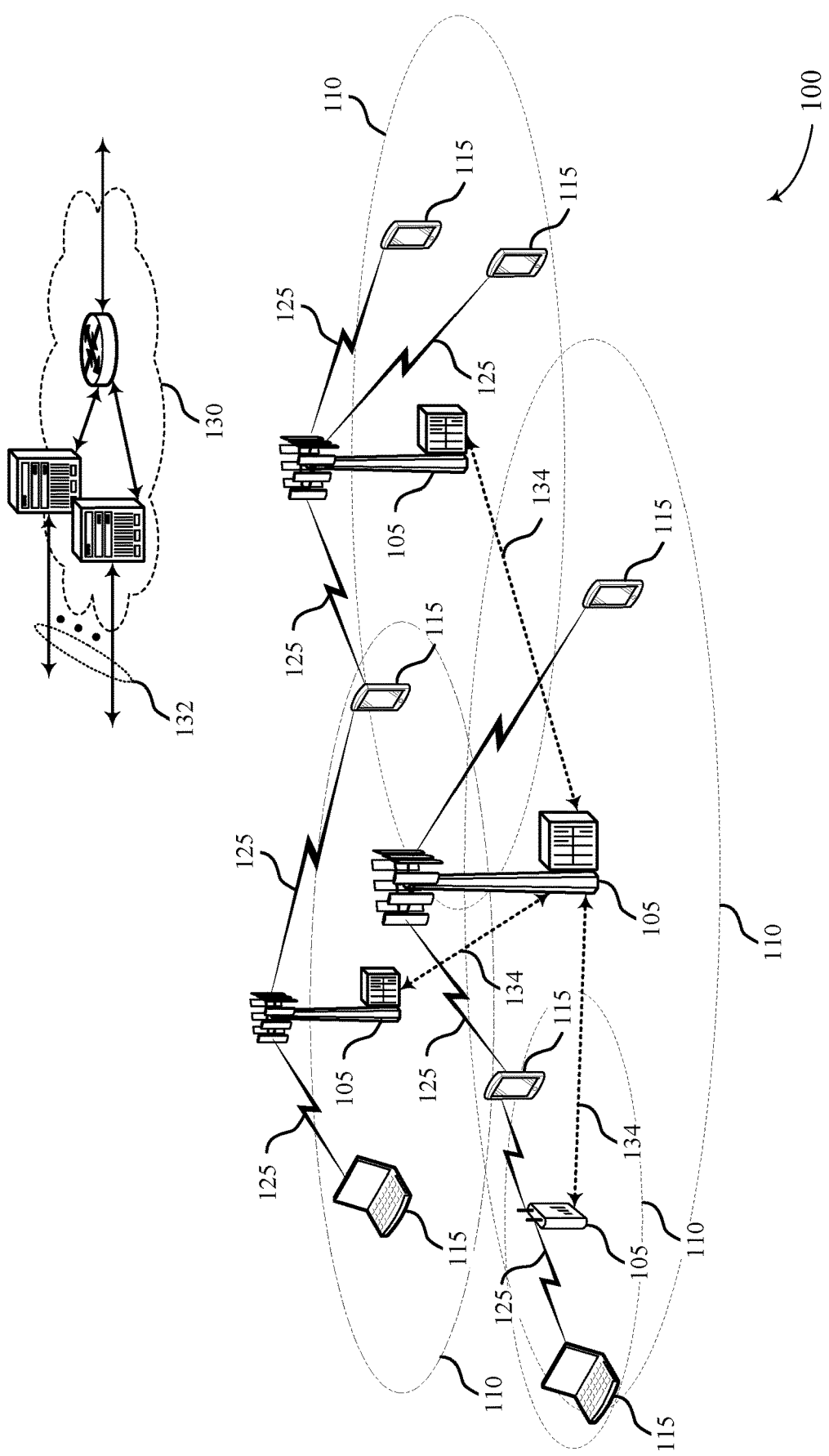
FIG. 1 illustrates an example of a system for wireless communications that supports mobility procedures with hierarchical mobility in accordance with aspects of the present disclosure.

FIG. 1 illustrates an example of a wireless communications system 100 that supports mobility procedures with hierarchical mobility in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P)

or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \, T_s$. The radio frames may be identified by a system frame number ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Techniques are described herein for mobility procedures configured to maintain UE 115 connectivity when the UE 115 moves between SFN areas. The mobility procedures may include procedures for moving between a serving RNA and a neighboring RNA (e.g., inter-RNA procedures), and/or procedures for moving between SFN areas within the serving RNA (e.g., intra-RNA procedures), which may in some cases include procedures for moving between TAs. In some mobility procedures, the UE 115 may skip decoding a system information block and/or may skip reading the system information.

Figure 2:
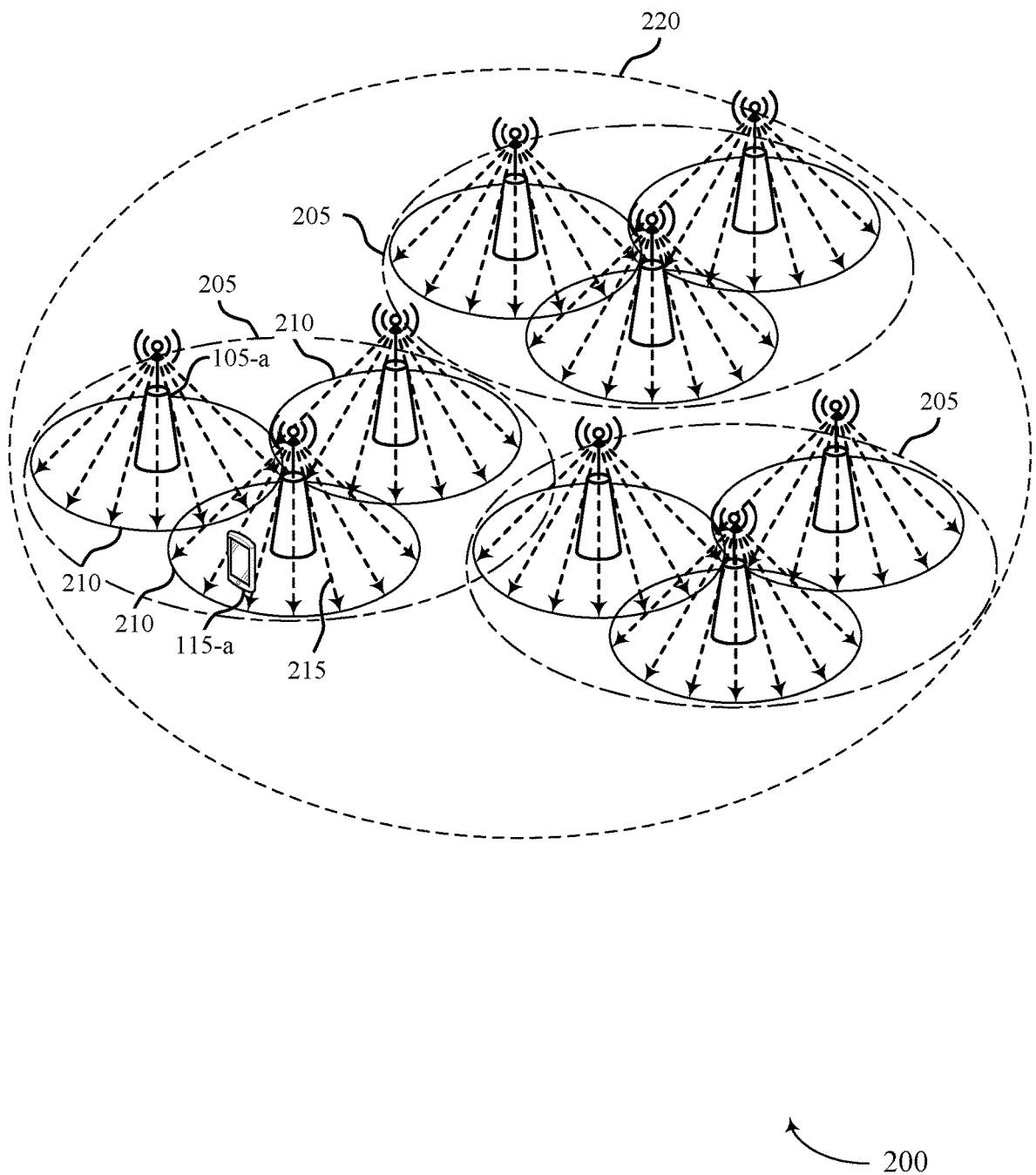
FIG. 2 illustrates an example of a wireless communication system that supports mobility procedures with hierarchical mobility in accordance with aspects of the present disclosure.

FIG. 2 illustrates an example of a wireless communications system 200 that supports mobility procedures with hierarchical mobility in accordance with aspects of the present disclosure. In some examples, the wireless communications system 200 may implement aspects of wireless communications system 100. The wireless communications system 200 may include one or more base stations 105-a and one or more UEs 115-a. The base stations 105-a may be examples of the base stations 105 described with reference to FIG. 1. In some examples, base station 105-a may be referred to as a network device and/or a next generation NodeB (gNB). The UE 115-a may be an example of the UEs 115 described with reference to FIG. 1.

The wireless communications system 200 may illustrate operations of and communications between the base stations 105-a and the UEs 115-a that support hierarchal mobility. A UE 115-a may be configured to operate in a plurality of different RRC states. The UE 115-a may be in a single RRC state selected from a set of RRC states at a given time. Examples of the RRC states of the UE 115-a may include an RRC connected state, an RRC inactive state, and an RRC idle state. The RRC idle state may be used for initial access to a network or to reduce power consumption of the UE. The RRC connected state may be used for active data transfer in the network. In some examples, the UE 115-a may operate in the RRC inactive state to reduce power consumption. The RRC inactive state or the RRC idle state may be associated with a discontinuous reception (DRX) state of UE 115-a, which may be configured by a protocol layer (e.g., RRC layer). In some examples, UE 115-a may perform updates in an RNA when operating in the RRC inactive state. Additionally or alternatively, UE 115-a may perform updates when UE 115-a moves outside the RNA in the RRC inactive state.

UE 115-a may transition between RRC states via one or more procedures. For example, the UE 115-a may use an establish procedure to transition from the RRC idle to the RRC connected state. In other examples, the UE 115-a may use a release procedure to transition from the RRC connected or RRC inactive state or from the RRC connected state to the RRC idle state. In other examples, the UE 115-a may use a release with suspend procedure to transition from the RRC connected state to the RRC inactive. In other examples, the UE 115-a may use a resume procedure to transition from the RRC inactive state to the RRC connected state.

When the UE 115-a is operating in the RRC inactive state or the RRC idle state, the UE 115-a may monitor for a variety of different signals to maintain the communication link with the network. For example, the UE 115-a may monitor for synchronization signals (SSs) and/or for paging signals. The UE 115-a may monitor for monitor for synchronization signals (e.g., primary synchronization signal or secondary synchronization signal) to obtain or maintain the cell identity and/or to obtain or maintain the frame timing, among other things. The UE 115-a may monitor for paging signals from the network when in a DRX mode (e.g., RRC idle state or RRC inactive state) that indicate the network (e.g., the base station 105-a) includes information waiting to be communicated to the UE 115-a. For example, the base station 105-a may receive an incoming call or incoming data that is addressed to the UE 115-a. The base station 105-a may transmit a paging to the UE 115-a based on receiving the incoming call or data.

The wireless communications system 200 may be configured to use millimeter-wave (mmW) spectrum to communicate data between the base station 105-a and the UE 115-a. Communications sent over mmW spectrum may be transmitted using directional beams formed using beam-forming techniques. Such directional beams may have limited spatial coverage. In some cases, the network may transmit some signals using beam sweeping to address issues that arise from the limited spatial coverage of directional beams in the mmW spectrum. Transmitting some signals by beam-sweeping directional beams may use increase the amount of communication resources used to communicate such signals. For example, the network may transmit synchronization signals or paging signals transmitted via one or more beam sweeps. In such examples, the UE 115-a may monitor for SSs or paging signals that have been transmitted using multiple directional beams 215 via a multi-beam monitoring procedure. In some cases, UE 115-a may monitor for paging over the RNA based on UE 115-a having the RRC inactive state. In some cases, UE 115-a may monitor paging over a tracking area (TA) 220 based on UE 115-a being in the RRC idle state. In some examples, the TA may include one or more RNAs.

The network (e.g., base station 105-a) may transmit a SS block (SSB) or an SSB set in mmW spectrum using a beam-sweeping procedure. The SSB or the SSB set may include one or more of a primary SS (PSS), a secondary SS (SSS), and a physical broadcast channel (PBCH). The SSB set may include a number of SSBs, where the number of SSBs that can be used may be based on a frequency spectrum, or a sub-carrier spacing (SCS) of the frequency spectrum, or both. In some examples, the SCS may be 15 kilohertz (kHz) or 30 kHz. In some examples, the UE 115-a may monitor for the SSB or SSB set during a 20 millisecond (ms) period or the UE 115-a may monitor for the SSB set in a frequency spectrum below 3 gigahertz (GHz) or in a frequency spectrum between 3 GHz and 6 GHz. UE 115-a may monitor for one or more mapping options in the 30 kHz SCS based on a band of the frequency spectrum.

In some cases, when UE 115-*a* monitors for the SSB set in the frequency spectrum below three (3) GHz, a first four (4) SSBs of the SSB set may be used. In some examples, when the SCS is 15 kHz, UE 115-*a* may monitor for the SSB set in a first two (2) ms of the 20 ms time period. In some examples, when the SCS is 30 kHz, UE 115-*a* may monitor for the SSB set in a first one (1) ms of the 20 ms time period.

In some cases, when UE 115-*a* monitors for the SSB set in the frequency spectrum between 3 GHz and 6 GHz, a first eight (8) SSBs of the SSB set may be used. In some examples, when the SCS is 15 kHz, UE 115-*a* may monitor for the SSB set in a first four (4) ms of the 20 ms time period. In some examples, when the SCS is 30 kHz, UE 115-*a* may monitor for the SSB set in a first two (2) ms of the 20 ms time period.

Transmitting directional beams using a beam-sweeping pattern and/or monitoring for such signals may use more communication resources compared to a single beam procedure (e.g., in the sub-6 GHz frequency spectrum band). In some examples, monitoring for a multi-beam SSB or SSB set may require the UE 115-*a* to perform additional processing and/or a longer radio frequency (RF) ON time compared to monitoring for a single-beam SSB or SSB set. Additionally or alternatively, the multi-beam monitoring procedure may be associated with multi-beam paging, which may lead to other signaling inefficiencies.

Techniques are described herein for signaling procedures that use a hierarchical mobility. Procedures that use hierarchical mobility may reduce the amount of signaling and resources used to communicate synchronization signals and/or paging signals when the UE 115-*a* is operating in the RRC inactive state or the RRC idle state. In hierarchal mobility, the wireless communications system 200 may be configured with a plurality of areas (e.g., a TA, a RAN-AC, or an RNA) in which one or more SFNs are established for certain types of signals. A synchronization signal or a paging signal may be transmitted using a first set of communication resources in a first area, while the synchronization signal or the paging signal may be transmitted using a second set of communication resources in a second area that neighbors the first area. In this manner, SFNs may be employed without interfering with neighboring transmissions.

In some cases, the SFN may be associated with a SFN area, which may correspond to one or more of a cell 210, an RNA, a RAN-AC 205, a TA 220, or a combination thereof. The SFN may be associated with one or more SFN SSs or with one or more SFN paging signals. UE 115-*a* may monitor for the one or more SFN SSs and/or the one or more SFN paging signals while in the RRC idle state or the RRC inactive state. The communication resources used to communicate the one or more SFN SSs or the one or more SFN paging signals may be associated with a cell 210, an RNA, a RAN-AC 205, a TA 220, or a combination thereof. The RAN-AC may be associated with one or more cells 210.

UE 115-*a* may operate according to the hierarchical mobility in one or more frequency spectrum bands. In some examples, UE 115-*a* may operate according to the hierarchical mobility in frequency spectrums associated with frequency spectrum bands below 6 GHz. Additionally or alternatively, UE 115-*a* may operate according to the hierarchical mobility in frequency spectrum bands 6 GHz and above (e.g., mmW spectrum). In some examples, the one or more SFN SSs or the one or more SFN paging signals may be communicated using a single-beam signal communicated over the mmW network.

To facilitate hierarchical mobility, the coverage area of the network may be divided into one or more zones. The UE 115-*a* may identify the one or more zones. In some examples, each zone of the one or more zones may correspond to an update area. In some examples, the zone used in the hierarchical mobility may be based on the RRC state in which the UE 115-*a* is operating. In some examples, when the UE 115-*a* is operating in the RRC idle state the one or more zones may correspond to one or more TAs 220 or one or more RAN-ACs 205. Additionally or alternatively, when the UE 115-*a* is operating in the RRC inactive state, the UE 115-*a* may identify that the one or more zones correspond to one or more RNAs or one or more RAN-ACs 205. Each zone of the one or more zones may include one or more RAN-ACs. Each RAN-AC of the one or more RAN-ACs may include one or more cells 210. The network may define the one or more RAN-ACs for used for the UEs 115-*a*.

In some cases, UE 115-*a* may identify an RNA associated with UE 115-*a* based on signaling from a base station 105-*a*. In some examples, RNA may include one or more cells 210. Each cell 210 may be associated with a cell identity and a RAN-AC. UE 115-*a* may receive a system information block (SIB) identifying the cell identity. Additionally or alternatively, RNA may include one or more RAN-ACs 205, which in turn may include one or more cells 210.

In some cases, the network or UE 115-*a* may define the RNA. In some examples, the network may define RNA over one or more TAs 220. In some examples, the network may define RNA based on information received from the UE 115-*a*. In some examples, the network may define a boundary of RNA corresponding to UE 115-*a* based on identifying a mobility of UE 115-*a* (e.g., a speed with which the UE 115-*a* moves through the coverage area of the base station 105-*a* or network). The boundary of the RNA corresponding to a first UE may be different than a boundary of another RNA corresponding to a second UE. In some examples, UE 115-*a* may move relatively fast through the coverage area and thus may have a high mobility. In other examples, UE 115-*a* move relatively slow through the coverage area and thus may have a low mobility.

In some examples, an RNA may include one or more RAN-ACs 205. The network may identify one or more SFN areas associated with UE 115-*a*, where a SFN area corresponds to a TA 220, a RAN-AC 205, or an RNA. UE 115-*a* may monitor for SFN SSs based on the SFN area associated with UE 115-*a*.

In some examples, an RNA may include one or more RAN-ACs 205 and/or one or more cells 210. In such examples, the SFN area may correspond to the RNA. The UE 115-*a* may monitor for SFN SSs based on the RNA associated with UE 115-*a*. In some cases, the network may transmit SFN SSs based on the boundary of RNA corresponding to one or more UEs 115.

The network may include an SFN paging controller. The SFN paging controller may be configured to synchronize SFN paging transmission for each of the one or more SFN areas (e.g., TA 220, RAN-AC 205, or RNA).

In some examples, UE 115-*a* may monitor idle paging from a core network 130 and for inactive paging from a base station 105-*a* while in the RRC inactive state. Idle paging may correspond to paging signals associated with core network paging. Inactive paging may correspond to paging signals associated with RAN paging. The network may lose a context of UE 115-*a* due to a failure or malfunction and perform idle paging for UE 115-*a* in the RRC inactive state. In some examples, UE 115-*a* may monitor for the idle paging and the inactive paging on a single physical channel.

UE 115-*a* may distinguish the idle paging and the inactive paging based on an identifier included in a paging message.

UE 115-*a* may receive SFN paging signals, which may include the idle paging and/or the inactive paging. In some examples, the SFN paging signals may include paging from core network 130 and/or paging from a RAN associated with UE 115-*a*. The SFN paging may include an indication whether the paging is received from core network 130 or from the RAN associated with UE 115-*a*.

UE 115-*a* may perform a random access channel (RACH) procedure in the hierarchical mobility. UE 115-*a* may acquire a serving cell 210 to perform the RACH procedure. UE 115-*a* may perform the RACH procedure based on the RAN-AC associated with UE 115-*a*. In some examples, UE 115-*a* may perform the RACH procedure based on receiving paging signals. Additionally or alternatively, UE 115-*a* may perform the RACH procedure based on transitioning to the RRC connected state.

Figure 3:
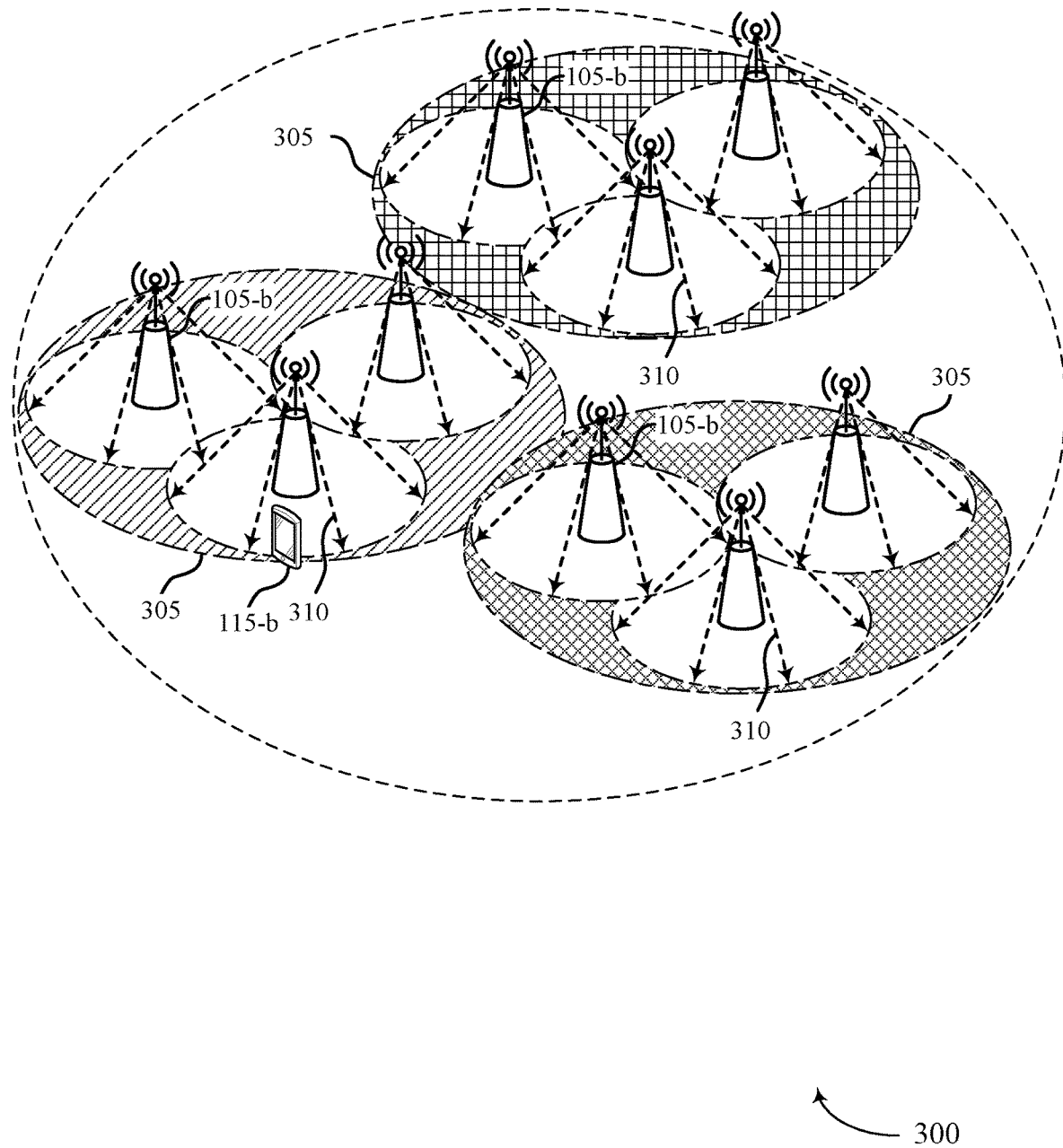
FIG. 3 illustrates an example of a wireless communication system that supports mobility procedures with hierarchical mobility in accordance with aspects of the present disclosure.

FIG. 3 illustrates an example of a wireless communication system 300 that supports mobility procedures with hierarchical mobility in accordance with aspects of the present disclosure. In some examples, the wireless communication system 300 may implement aspects of wireless communications systems 100 and 200. The wireless communication system 300 may include one or more base stations 105-*b* and one or more UEs 115-*b*. The base stations 105-*b* may be examples of the base stations 105 described with reference to FIGS. 1 through 2. The UE 115-*b* may be an example of the UEs 115 described with reference to FIGS. 1 through 2.

The wireless communication system 300 may illustrate hierarchical mobility procedures where the communication resources used to communicate SFN signals 310 (e.g., synchronization signals, or paging signals, or both) are defined on the basis of RAN-AC 305. When the UE 115-*b* is operating in the RRC inactive state or the RRC idle state, the UE 115-*b* may be configured to monitor for synchronization signals, or paging signals, or both transmitted by the base station 105-*b*. In the wireless communication system 300, an SFN used to communicate these signals may be defined for each RAN-AC. In some cases, the SFNs defined for the RAN-ACs may be configured such that neighboring RAN-ACs may not use the same communication resources as part of their SFNs. In the examples of the wireless communication system 300 the SFN area associated with an SFN may be a RAN-AC 305.

In some wireless communication systems, multi-beam synchronization signals or multi-beam paging signals or both may be transmitted over a wide area to reach an intended UE 115-*b*. In the wireless communication system 300, which uses hierarchical mobility, SFNs may be used to transmit the multi-beam synchronization signals or the multi-beam paging signals or both. The SFNs, however, may be defined on a RAN-AC-by-RAN-AC basis. In this manner, the amount of communication resources use to communicate synchronization signals or paging signals, among other examples, between the base station 105-*b* and the UE 115-*b* may be reduced.

The network may identify communication resources (e.g., frequency-based resources or time-based resources) of an SFN used for communicating synchronization signals, or paging signals, or both in an SFN area (e.g., RAN-AC 305). In the wireless communication system 300, the SFN area may be a RAN-AC 305. In some examples, different communication resources may be used to communicate synchronization signals, or paging signals, or both in neighboring RAN-ACs 305 (e.g., SFN areas). In such examples, RAN-ACs 305 (e.g., SFN areas) near each other may use different communication resources so they don't interfere with one another.

The network may transmit an indication of the SFN areas and/or the communication resources to the UE 115-*b*. In some cases, the base station 105-*b* may transmit an RRC message that includes the indication. The indication may include a listing of RAN-ACs associated with the UE 115-*b*, identifiers for the RAN-ACs associated with the UE 115-*b*, the communication resources to be used in each RAN-AC 305 to transmit synchronization signals, or paging signals, or both, or a combination thereof. In some cases, the allocation of resources to each RAN-AC 305 (e.g., SFN area) may be done dynamically by the network based on network conditions in a location. In other cases, the allocation of resources to each RAN-AC 305 (e.g., SFN area) may be done a static basis or a semi-static basis. For example, the communication resources assigned to a RAN-AC 305 may be identifiable based on the identifier of the RAN-AC 305.

The UE 115-*b* may identify the RAN-AC 305 (e.g., SFN area) in which it is operating. The UE 115-*b* may also identify the communication resources (e.g., frequency resources) allocated to the identified RAN-AC 305 for communicating synchronization signals, or paging signals, or both. The UE 115-*b* may monitor for synchronization signals, or paging signals, or both based on the RAN-AC 305 (e.g., SFN area) in which it is operating and based on the communication resources associated with that RAN-AC 305 (e.g., SFN area).

When the UE 115-*b* moves from a first RAN-AC 305 to a second RAN-AC 305, the UE 115-*b* may perform procedures to monitor a second set of communication resources for synchronization signals, or paging signals, or both in the second RAN-AC 305. The second set of communication resources may be different than the first set of communication resources used with the first RAN-AC 305. In some cases, the UE 115-*b* may identify the communication resources based on the identifiers for the RAN-ACs 305.

The RAN-AC 305 may be used as the SFN area in hierarchical mobility when the UE 115-*b* is operating in the RRC inactive state or the RRC idle state. The UE 115-*b* may identify that it is operating in the RRC inactive state or the RRC idle state before monitoring for the synchronization signals or the paging signals or both.

Figure 4:
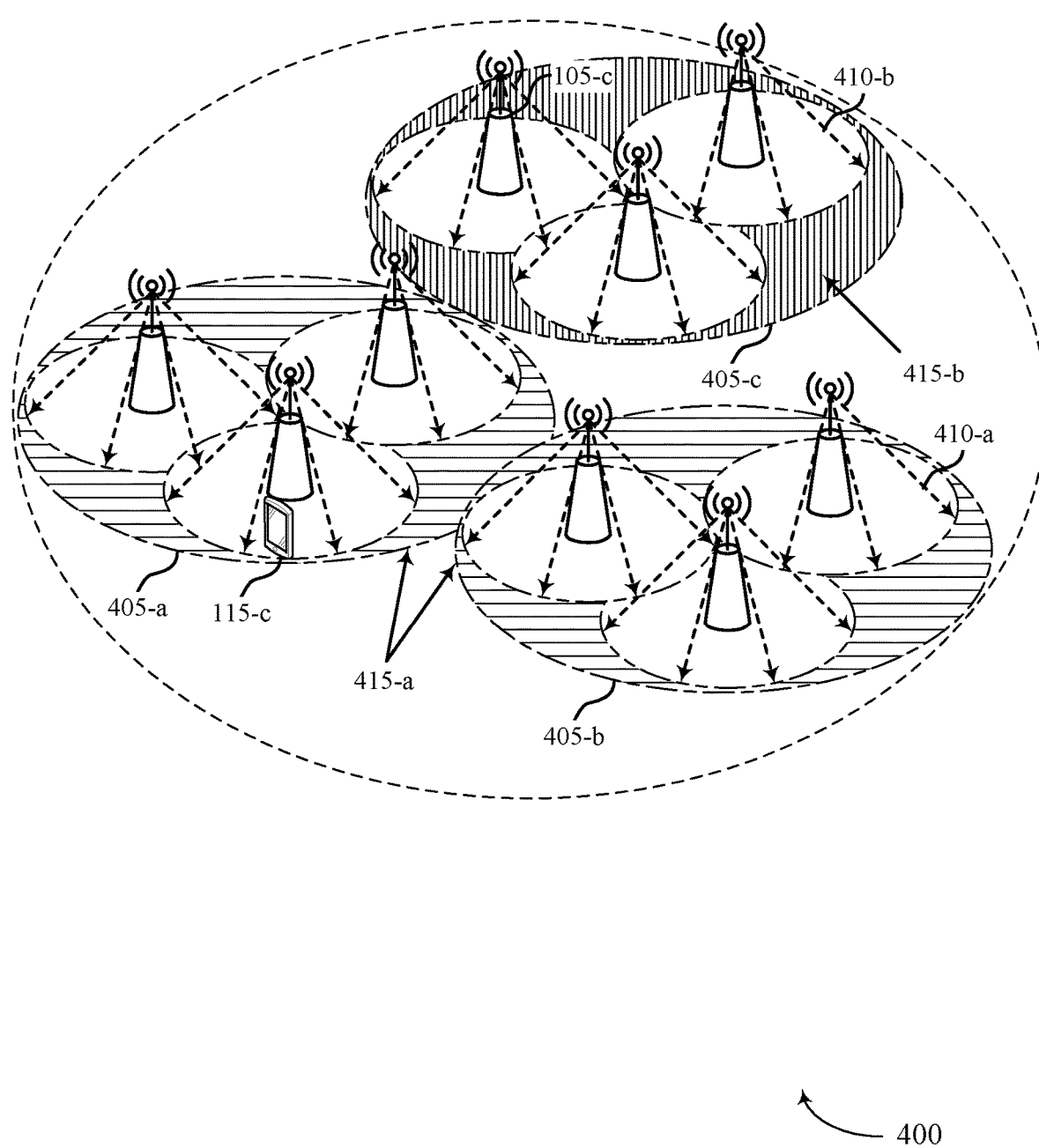
FIG. 4 illustrates an example of a wireless communication system that supports mobility procedures with hierarchical mobility in accordance with aspects of the present disclosure.

FIG. 4 illustrates an example of a wireless communication system 400 that supports mobility procedures with hierarchical mobility in accordance with aspects of the present disclosure. In some examples, the wireless communication system 400 may implement aspects of wireless communications system 100. The wireless communication system 400 may include one or more base stations 105-*c* and one or more UEs 115-*c*. The base stations 105-*c* may be examples of the base stations 105 described with reference to FIGS. 1 through 2. The UE 115-*c* may be an example of the UEs 115 described with reference to FIGS. 1 through 2.

The wireless communication system 400 may illustrate hierarchical mobility procedures where the communication resources used to communicate SFN signals 410 (e.g., synchronization signals, or paging signals, or both) are defined on the basis of RNA 415. When the UE 115-*c* is operating in the RRC inactive state, the UE 115-*c* may be configured to monitor for synchronization signals, or paging signals, or both (among other signals) transmitted by the base station 105-*c*. In the wireless communication system 400, an SFN used to communicate these signals may be defined for each RNA 415. In some cases, the SFNs defined for the RNA 415 may be configured such that neighboring RNAs (e.g., first RNA 415-a and second RNA 415-b) may not use the same communication resources as part of their SFNs. In the examples of the wireless communication system 400 the SFN area associated with an SFN may be an RNA 415. An RNA 415 may include one or more RAN-ACs 405. For example, the first RNA 415-a may include at least a first RAN-AC 405-a and a second RAN-AC 405-b, and the second RNA 415-b may include a single RAN-AC, a third RAN-AC 405-c.

In some wireless communication systems, multi-beam synchronization signals, or multi-beam paging signals, or both may be transmitted over a wide area to reach an intended UE 115-c. In the wireless communication system 400, which uses hierarchical mobility, SFNs may be used to transmit the multi-beam synchronization signals or the multi-beam paging signals or both. The SFNs, however, may be defined on an RNA-by-RNA basis. In this manner, the amount of communication resources use to communicate synchronization signals or paging signals between the base station 105-c and the UE 115-c may be reduced.

The network may identify communication resources (e.g., frequency-based resources or time-based resources) of an SFN used for communicating synchronization signals, or paging signals, or both in an SFN area (e.g., RNA 415). In the wireless communication system 400, the SFN area may be an RNA 415. In some examples, different communication resources may be used to communicate synchronization signals, or paging signals, or both in neighboring RNAs 415 (e.g., SFN areas). In such examples, RNA 415 (e.g., SFN areas) near each other may use different communication resources so they don't interfere with one another. In some cases, the UE 115-c may assist the network in defining the RNA 415 to be used while the UE 115-c is in the RRC inactive state. For example, if the UE 115-c is traveling at a high-rate of speed, the RNA 415 may be configured as larger than if the UE 115-c is traveling at a lower-rate of speed.

The network may transmit an indication of the SFN areas and/or the communication resources to the UE 115-c. In some cases, the base station 105-c may transmit an RRC message that includes the indication. The indication may include an identifier of the RNA 415, a listing of RAN-ACs associated with the UE 115-c or associated with the RNA 415, identifiers for the RAN-ACs associated with the UE 115-c, the communication resources to be used in each RAN-AC 405 to transmit synchronization signals, or paging signals, or both, or a combination thereof. In some cases, the allocation of resources to each RNA 415 (e.g., SFN area) may be done dynamically by the network based on network conditions in a location. In other cases, the allocation of resources to each RNA 415 (e.g., SFN area) may be done a static basis or a semi-static basis. For example, the communication resources assigned to an RNA 415 may be identifiable based on the identifier of the RNA 415.

The UE 115-c may identify the RNA 415 (e.g., SFN area) in which it is operating. The UE 115-c may also identify the communication resources (e.g., frequency resources) allocated to the identified RNA 415 for communicating synchronization signals, or paging signals, or both. The UE 115-c may monitor for synchronization signals, or paging signals, or both based on the RNA 415 (e.g., SFN area) in which it is operating and based on the communication resources associated with that RNA 415 (e.g., SFN area).

When the UE 115-c moves from a first RNA 415-a to a second RNA 415-b, the UE 115-c may perform procedures to monitor a second set of communication resources for synchronization signals, or paging signals, or both in the second RNA 415-b. The second set of communication resources may be different than the first set of communication resources used with the first RNA 415-a. In some cases, the UE 115-c may identify the communication resources based on the identifiers for the RNAs 415.

The RNA 415 may be used as the SFN area in hierarchical mobility when the UE 115-c is operating in the RRC inactive state. The UE 115-c may identify that it is operating in the RRC inactive state before monitoring for the synchronization signals or the paging signals or both.

Figure 5:
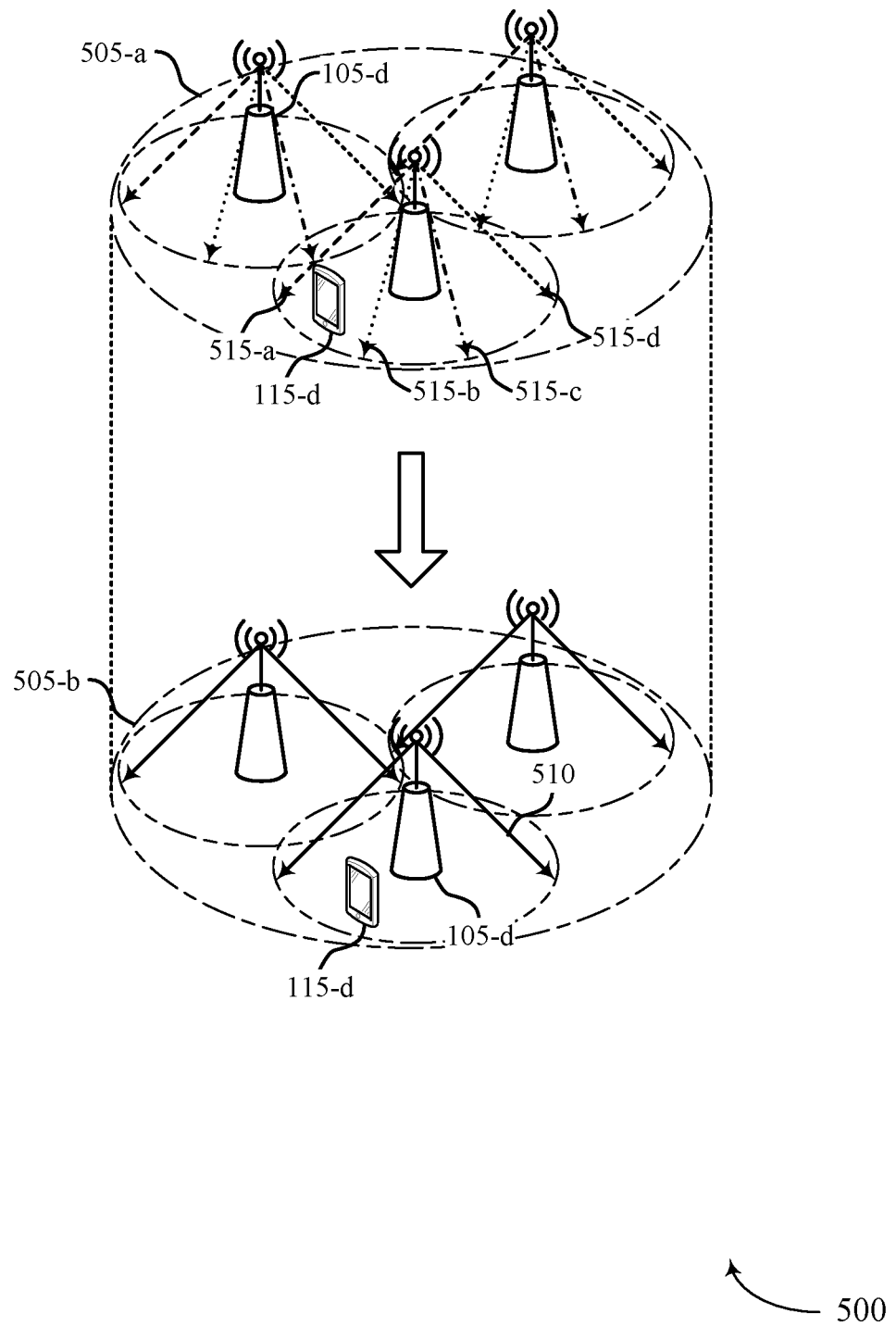
FIG. 5 illustrates an example of a wireless communication system that supports mobility procedures with hierarchical mobility in accordance with aspects of the present disclosure.

FIG. 5 illustrates an example of a wireless communication system 500 that supports mobility procedures with hierarchical mobility in accordance with aspects of the present disclosure. In some examples, the wireless communication system 500 may implement aspects of wireless communications system 100. The wireless communication system 500 may include one or more base stations 105-d and one or more UEs 115-d. The base stations 105-d may be examples of the base stations 105 described with reference to FIGS. 1 through 2. The UE 115-d may be an example of the UEs 115 described with reference to FIGS. 1 through 2.

The wireless communication system 500 illustrates two different configurations. In a first TA 505-a, multi-beam signaling for synchronization signals, or paging signals, or both is shown. In a second TA 505-b, SFN signaling for synchronization signals, or paging signals, or both is shown.

The wireless communication system 500 may illustrate hierarchical mobility procedures where the communication resources used to communicate SFN signals 510 (e.g., synchronization signals, or paging signals, or both) are defined on the basis of a TA 505. When the UE 115-d is operating in the RRC idle state, the UE 115-d may be configured to monitor for synchronization signals, or paging signals, or both transmitted by the base station 105-d. In the wireless communication system 500, an SFN used to communicate these signals may be defined for each TA 505. In some cases, the SFNs defined for the TA 505 may be configured such that neighboring TA 505 may not use the same communication resources as part of their SFNs. In the examples of the wireless communication system 500 the SFN area associated with an SFN may be a TA 505. A TA 505 may include one or more RNAs, one or more RAN-ACs, or one or more cells.

In the first TA 505-a, multi-beam synchronization signals or multi-beam paging signals or both may be transmitted over a wide area to reach an intended UE 115-d. For example, a base station 105-d may transmit a single paging message using a plurality of beams (e.g., beams 515-a, 515-b, 515-c, and/or 515-d) in a beam-sweeping pattern. In the wireless communication system 500, which uses hierarchical mobility, SFNs may be used to transmit the multi-beam synchronization signals or the multi-beam paging signals or both. The SFNs, however, may be defined on a TA-by-TA basis. In this manner, the amount of communication resources use to communicate synchronization signals or paging signals between the base station 105-d and the UE 115-d may be reduced.

The network may identify communication resources (e.g., frequency-based resources or time-based resources) of a SFN used for communicating synchronization signals, or paging signals, or both in an SFN area (e.g., TA 505). In the wireless communication system 400, the SFN area may be an TA 505. In some examples, different communication resources may be used to communicate synchronization signals, or paging signals, or both in neighboring TAs 505 (e.g., SFN areas). In such examples, TAs 505 (e.g., SFN areas) near each other may use different communication resources so they don't interfere with one another.

The network may transmit an indication of the SFN areas and/or the communication resources to the UE 115-d. In some cases, the base station 105-d may transmit an RRC message that includes the indication. The indication may include an identifier of the TA 505, a listing of RAN-ACs associated with the UE 115-d or associated with the TA 505, identifiers for the RAN-ACs associated with the UE 115-d, the communication resources to be used in each RAN-AC 405 to transmit synchronization signals, or paging signals, or both, or a combination thereof. In some cases, the allocation of resources to each TA 505 (e.g., SFN area) may be done dynamically by the network based on network conditions in a location. In other cases, the allocation of resources to each TA 505 (e.g., SFN area) may be done a static basis or a semi-static basis. For example, the communication resources assigned to an TA 505 may be identifiable based on the identifier of the TA 505.

The UE 115-d may identify the TA 505 (e.g., SFN area) in which it is operating. The UE 115-d may also identify the communication resources (e.g., frequency resources) allocated to the identified TA 505 for communicating synchronization signals, or paging signals, or both. The UE 115-d may monitor for synchronization signals, or paging signals, or both based on the TA 505 (e.g., SFN area) in which it is operating and based on the communication resources associated with that TA 505 (e.g., SFN area).

When the UE 115-d moves from a first TA 505 to a second TA 505, the UE 115-d may perform procedures to monitor a second set of communication resources for synchronization signals, or paging signals, or both in the second TA 505. The second set of communication resources may be different than the first set of communication resources used with the first TA 505. In some cases, the UE 115-d may identify the communication resources based on the identifiers for the TA 505.

The TA 505 may be used as the SFN area in hierarchical mobility when the UE 115-d is operating in the RRC inactive state. The UE 115-d may identify that it is operating in the RRC inactive state before monitoring for the synchronization signals or the paging signals or both.

Figure 6:
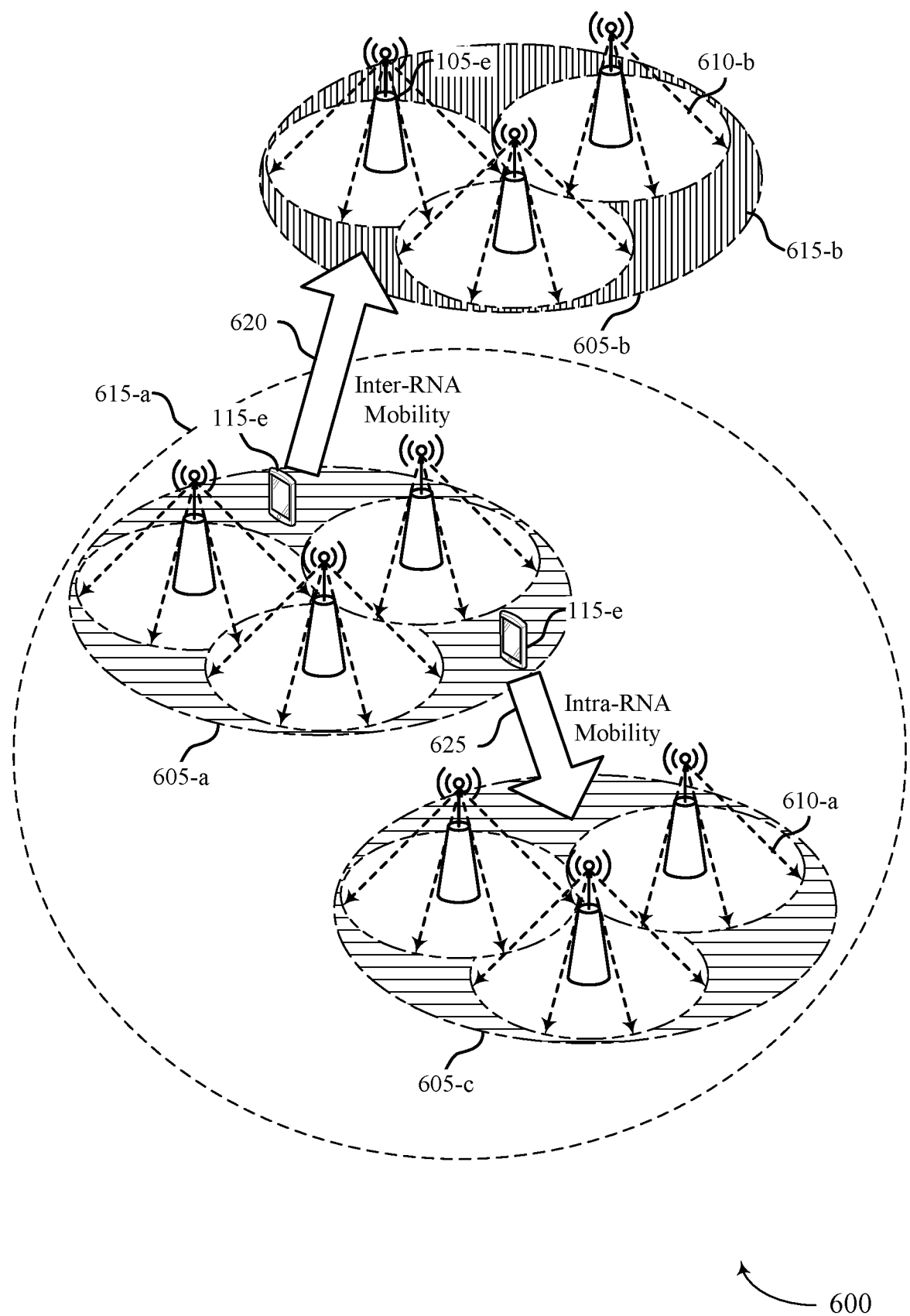
FIG. 6 illustrates an example of a wireless communication system that supports mobility procedures with hierarchical mobility in accordance with aspects of the present disclosure.

FIG. 6 illustrates an example of a wireless communication system 600 that supports mobility procedures with hierarchical mobility in accordance with aspects of the present disclosure. In some examples, the wireless communication system 600 may implement aspects of wireless communications system 100. The wireless communication system 600 may include one or more base stations 105-e and one or more UEs 115-e. The base stations 105-e may be examples of the base stations 105 described with reference to FIGS. 1 through 2. The UEs 115-e may be examples of the UEs 115 described with reference to FIGS. 1 through 2.

The UEs 115-e may move through a coverage area of a network. As the UEs 115-e move through the coverage area, area reselection procedures (e.g., mobility procedures) may be implemented to allow the UE 115-e and/or the base station 105-e to reselect the SFN area associated with the UE 115-e. Some examples of these area reselection procedures may include inter-RNA procedures 620 and intra-RNA procedures 625.

For inter-RNA procedures 620, the UE 115-e may move between SFN areas (e.g., from a first SFN area 605-a to a second SFN area 605-b) that are in different RNAs (e.g., a first RNA 615-a and a second RNA 615-b). In some inter-RNA procedures 620, a RACH procedure may be performed, which may cause some latency in the area reselection procedure. To reduce the latency in some inter-RNA procedures 620, the UE 115-e may perform PSS detection, SSS detection, and master information block (MIB) decoding, but the UE 115-e may refrain from performing system information block (SIB) decoding (e.g., system information block type 1 (SIB1) decoding) in some cases. In other inter-RNA procedures 620, the UE 115-e may also perform SIB decoding. The base station 105-e and the UE 115-e may communicate to enable SIB decoding or disable SIB decoding in inter-RNA procedures. In some cases, a RACH procedure may be performed without performing an area reselection procedure. For example, UE 115-e may perform the RACH procedure based on receiving paging signals. Additionally or alternatively, UE 115-e may perform the RACH procedure based on transitioning to the RRC connected state.

For intra-RNA procedures 625, the UE 115-e may move between SFN areas (e.g., from the first SFN area 605-a to a third SFN area 605-c) that are in the same RNA (e.g., the first RNA 615-a). Examples of an intra-RNA procedure 625 may occur when a UE 115-e moves between two RAN-ACs in the same RNA. In some intra-RNA procedures 625, the UE 115-e may refrain from reading the system information as part of the area reselection procedure. In some intra-RNA procedures 625, the UE 115-e may identify a control resource set (CORESET) configuration or a search space configuration based on the RAN-AC ID of the serving RAN-AC.

The UE 115-e may identify the SFN area in which it is operating. The UE 115-e may also identify communication resources (e.g., frequency resources) allocated to the serving RNA 615 or RAN-AC for communicating synchronization signals, or paging signals, or both. The UE 115-e may monitor for synchronization signals, or paging signals, or both based on the SFN area in which it is operating and based on the communication resources associated with that SFN area.

Figure 7:
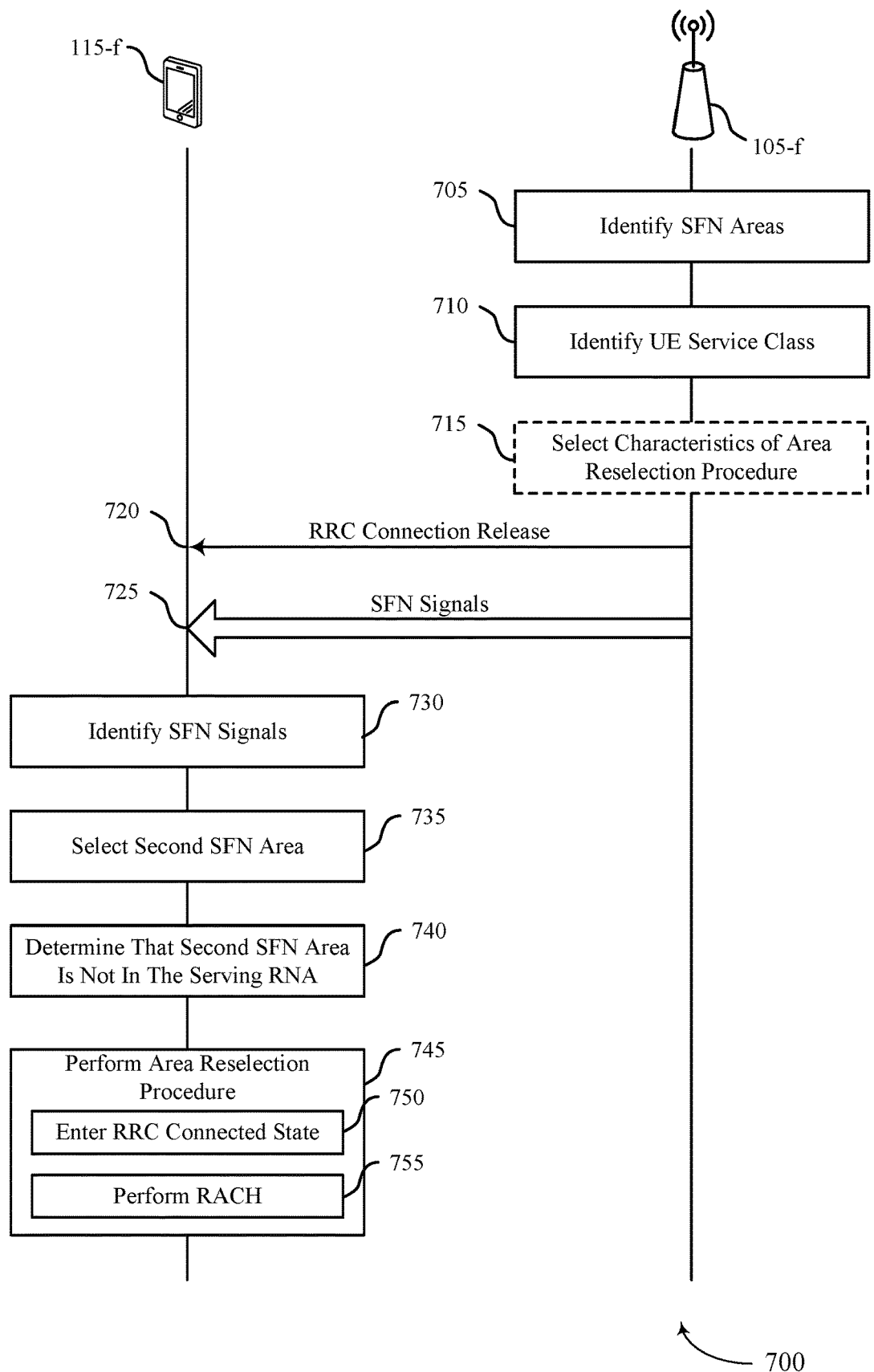
FIG. 7 illustrates an example of a process flow that supports mobility procedures with hierarchical mobility in accordance with aspects of the present disclosure.

FIG. 7 illustrates an example of a process flow 700 that supports mobility procedures with hierarchical mobility in accordance with aspects of the present disclosure. In some examples, the process flow 700 may implement aspects of wireless communications system 100. The process flow 700 illustrates functions of communications between a base station 105-f and a UE 115-f. The base station 105-f may be an example of the base stations 105 described with reference to FIGS. 1 through 6. The UE 115-f may be an example of the UEs 115 described with reference to FIGS. 1 through 6.

The process flow 700 may illustrate one or more inter-RNA procedures implemented by the UE 115-f, base station 105-f, or a combination thereof. The inter-RNA procedures may be configured to be performed when the UE 115-f is in an RRC inactive state.

At 705, base station 105-f may identify one or more SFN areas for communicating signals, such as SFN synchronization signals or SFN paging signals, with a UE 115-f operating in an RRC inactive mode or an RRC idle mode. The base station 105-f may identify communication resources for communicating the SFN synchronization signals or the SFN paging signals within at least one if not each SFN area. The communication resources used in neighboring SFN areas may be varied to reduce interference between SFN areas. In some cases, the base station 105-f may identify an SFN area associated with the UE 115-f operating in an RRC inactive mode or an RRC idle mode. In some examples, an SFN area may be an example of a RAN-AC. In some examples, an SFN area may be an example of a group of cells defined by the network. The base station 105-f may identify an RRC state of UE 115-f, which may include the RRC inactive or the RRC idle state.

At 710, base station 105-*f* may identify a service class of UE 115-*f*. The base station 105-*f* and/or the UE 115-*f* may implement different inter-RNA procedures based on the service class of the UE 115-*f* in some cases. A service class of a UE 115-*f* may be used by a network to determine how the traffic to and from that UE 115-*f* is to be handled. In some cases, different quality of service parameters may be associated with different service classes of the UE 115-*f*. In some cases, the service class of UE 115-*f* may include a performance requirement associated with a signal communicated with UE 115-*f*, a data rate of the signal, a mobility of UE 115-*f*, a latency requirement associated with the signal, or a reliability parameter associated with the signal, or the like, or a combination thereof.

At 715, base station 105-*f* may optionally select one or more characteristics of an area reselection procedure for the UE 115-*f*. For example, the base station 105-*f* may select whether the area reselection procedure includes instructions for decoding a system information block (e.g., a system information type 1 block) based on the identified first SFN area and the identified service class of UE 115-*f*. If the base station 105-*f* determines that lower latency of traffic is preferable, the base station 105-*f* may determine that the UE 115-*f* should not perform SIB decoding during an inter-RNA procedure. If the base station 105-*f* determines that conserving power by the UE 115-*f* is more preferable, the base station may determine that the UE 115-*f* should perform SIB decoding.

The base station 105-*f* may transmit, and UE 115-*f* may receive, an RRC connection release message 720 indicating the characteristics of the area reselection procedure. For example, the RRC connection release message 720 may indicate whether the UE 115-*f* is to decode the system information block as part of an area reselection procedure (e.g., an inter-RNA procedure). The RRC connection release message 720 may, in some cases, indicate a set of one or more RAN-ACs included in the serving RNA associated with UE 115-*f*. In some examples, the RRC connection release message 720 may indicate a search space configuration for one or more SFN paging signals associated with the first SFN area. The RRC connection release message 720 may indicate a set of one or more SFN areas associated with the serving RNA. UE 115-*f* may enter the RRC inactive state based on receiving the RRC connection release message.

The base station 105-*f* may transmit SFN signals 725 (e.g., one or more SFN synchronization signals, one or more SFN paging signals) within one or more SFN areas associated with the base station 105-*f*. When the base station 105-*f* services more than one UE 115-*f*, the base station 105-*f* may be associated with a plurality of SFN areas, and each SFN area may use different communication resources to communicate the SFN signals 725. UE 115-*f* may receive one or more of the SFN signals 725 (e.g., one or more SFN synchronization signals or one or more SFN paging signals). In some examples, transmitting the one or more SFN synchronization signals or one or more SFN paging signals may be based on the RRC connection release message.

In some cases, the RRC connection release message 720 may include CORESET/search space configurations for the serving RNA. In such cases, the serving RNA may share a common CORESET/search space configuration between different SFN areas within the RNA. The time periods for monitoring for SFN synchronization signals may be based on the SFN area identifiers for the SFN areas. In some examples, the CORESET/search space configurations may be hashed using the identifier of the SFN area (e.g., RAN-AC ID).

At 730, UE 115-*f* may identify the one or more SFN synchronization signals or one or more SFN paging signals associated with the first SFN area based on receiving the SFN signals 725 associated with the serving SFN area.

In some examples, UE 115-*f* may switch from monitoring for signals associated with the first SFN area to monitoring for signals associated with the serving cell. Additionally or alternatively, UE 115-*f* may switch from monitoring for signals associated with the serving cell to monitoring for signals associated with the first SFN area. The UE 115-*f* may determine whether a reselection condition is satisfied based on identifying the one or more SFN synchronization signals or one or more SFN paging signals.

As part of determining whether a reselection condition is satisfied, the UE 115-*f* may measure a signal strength (or other signal characteristic) of the one or more SFN synchronization signals associated with the serving SFN area, and measure a signal strength (or other signal characteristic) associated with one or more SFN synchronization signals associated with a neighboring SFN area. When the signal strength (or other signal characteristic) of the serving SFN area drops below a first threshold and the signal strength (or other signal characteristic) of a neighboring SFN area exceeds a second threshold, UE 115-*f* may determine that the reselection condition is satisfied. In some cases, the measured signal characteristics may be a reference signal receive power (RSRP). In some cases, the first threshold associated with the serving SFN area is different than the second threshold associated with the neighboring SFN area. In some cases, the first threshold and the second threshold are independent of one another. In some cases, second threshold may be some offset of the first threshold.

At 735, UE 115-*f* may select the second SFN area based on determining whether the reselection condition is satisfied. In some examples, the second SFN area may include a second RAN-AC or a second group of cells defined by the network. In some examples, UE 115-*f* may determine, based on selecting the second SFN area, that the second SFN area is included in the serving RNA associated with the first SFN area. This may be an example of the inter-RNA mobility 620. UE 115-*f* may determine an identifier of the second SFN area information included in the SFN signals 725 received from the second SFN area. UE 115-*f* may identify a period for monitoring the one or more SFN paging signals based on the determined identifier of the second SFN area. UE 115-*f* may determine that the second SFN area is included in a different RNA than the serving RNA associated with the first SFN area based on comparing the identifier of the second SFN area with a portion of the set of SFN areas indicated by the RRC connection release message.

At 740, the UE 115-*f* may determine that the second SFN selected by the UE 115-*f* is not in the RNA currently serving the UE 115-*f*. In some cases, when the UE 115-*f* enters the inactive state, the base station 105-*f* may transmit a list of SFN area identifiers (e.g., RAN-AC identifiers) that are included in the serving RNA. When the UE 115-*f* receives an SFN signal 725, the UE 115-*f* may be able to determine the identifier of its associated SFN area. The UE 115-*f* may compare the identifier in the SFN signal 725 to the list of identifiers associated with the serving RNA. If the identifier is not on the list, the UE 115-*f* may determine that the SFN signals 725 are associated with a second RNA (e.g., sometimes referred to as a target RNA) that is different than the serving RNA. In some cases, the RRC connection release message may include a list of PCIDs associated with the serving RNA. Serving cell matching may be based on PCID matching, where cell identity may not be available before SIB decoding.

At 745, the UE 115-*f* may perform the area reselection procedure based on selecting the second SFN area. The area reselection procedure may be an inter-RNA procedure based on the second SFN area being in a different RNA than the serving RNA. To perform an inter-RNA procedure, the UE 115-*f* may enter an RRC connected state (at 750) and may perform RACH (at 755) based on a RACH configuration provided by the base station 105-*f*. An example of a RACH configuration may include whether the UE 115-*f* is to decode the SIB as part of the RACH. The UE 115-*f* may perform the area reselection procedure without reading the system information block based on the indication in the RRC connection release message. In some cases, hashing may be applied based on the PCID for preamble selection. In some cases, a RACH configuration for an inter-RNA procedure (e.g., no decoding of SIB) may be larger than standard RACH configurations. Details about the RACH configuration may be signaled as part of one or more RRC connection release messages. In some cases, a RACH procedure may be performed without performing an area reselection procedure. For example, UE 115-*f* may perform the RACH procedure based on receiving paging signals. Additionally or alternatively, UE 115-*f* may perform the RACH procedure based on transitioning to the RRC connected state.

Figure 8:
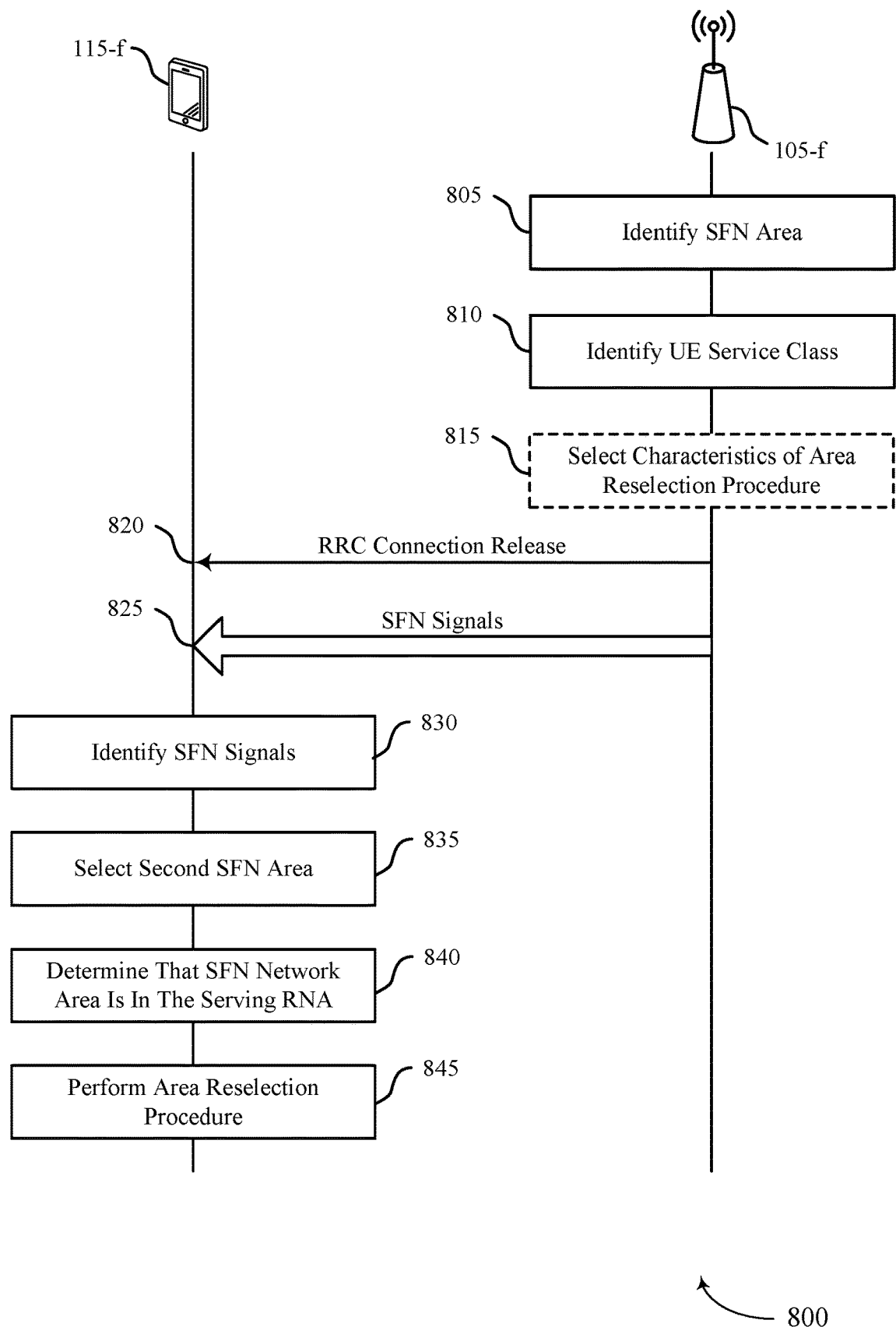
FIG. 8 illustrates an example of a process flow that supports mobility procedures with hierarchical mobility in accordance with aspects of the present disclosure.

FIG. 8 illustrates an example of a process flow 800 that supports mobility procedures with hierarchical mobility in accordance with aspects of the present disclosure. In some examples, the process flow 800 may implement aspects of wireless communications system 100. The process flow 800 illustrates functions of communications between a base station 105-*g* and a UE 115-*g*. The base station 105-*g* may be examples of the base stations 105 described with reference to FIGS. 1 through 6. The UE 115-*g* may be an example of the UEs 115 described with reference to FIGS. 1 through 6.

The process flow 800 may illustrate one or more intra-RNA procedures implemented by the UE 115-*g*, base station 105-*g*, or a combination thereof. The intra-RNA procedures may be configured to be performed when the UE 115-*g* is in an RRC inactive state or an RRC idle state. An example of an intra-RNA procedure may be an inter-RAN-AC procedure, where the UE 115-*g* moves from a serving RAN-AC to a neighboring RAN-AC, or an inter-TA procedure, where the UE 115-*g* moves from a serving TA to a neighboring TA.

At 805, base station 105-*g* may identify one or more SFN areas for communicating SFN synchronization signals or SFN paging signals with a UE 115-*g* operating in an RRC inactive mode or an RRC idle mode. The base station 105-*g* may identify communication resources for communicating the SFN synchronization signals or the SFN paging signals within each SFN area. The communication resources used in neighboring SFN areas may be varied to reduce interference between SFN areas. In some cases, the base station 105-*g* may identify an SFN area associated with the UE 115-*g* operating in an RRC inactive mode or an RRC idle mode. In some examples, an SFN area may be an example of a RAN-AC. In some examples, an SFN area may be an example of a group of cells defined by the network. The base station 105-*g* may identify an RRC state of UE 115-*g*, which may include the RRC inactive or the RRC idle state.

At 810, base station 105-*g* may identify a service class of UE 115-*g*. The base station 105-*g* and/or the UE 115-*g* may implement different intra-RNA procedures based on the service class of the UE 115-*g* in some cases.

At 815, base station 105-*g* may optionally select one or more characteristics of an area reselection procedure for the UE 115-*g*. For example, the base station 105-*g* may determine that the intra-RNA procedure does not include the reading of system information. In such cases, the UE 115-*g* may perform SFN area reselection (e.g., RAN-AC reselection) without reading the system information.

The base station 105-*g* may transmit, and UE 115-*g* may receive, an RRC connection release message 820 indicating the characteristics of the area reselection procedure. For example, the RRC connection release message 820 may indicate that the intra-RNA procedure does not include reading the system information. The RRC connection release message 820 may, in some cases, indicate a set of one or more RAN-ACs included in the serving RNA associated with UE 115-*g*. In some examples, the RRC connection release message 820 may indicate a search space configuration for one or more SFN paging signals associated with the first SFN area. The RRC connection release message 820 may indicate a set of one or more SFN areas associated with the serving RNA. UE 115-*g* may enter the RRC inactive state or the RRC idle state based on receiving the RRC connection release message.

The base station 105-*g* may transmit SFN signals 825 (e.g., one or more SFN synchronization signals or the one or more SFN paging signals) within one or more SFN areas associated with the base station 105-*g*. When the base station 105-*g* services more than one UE 115-*g*, the base station 105-*g* may be associated with a plurality of SFN areas, and each SFN area may use different communication resources to communicate the SFN signals 825. UE 115-*g* may receive one or more of the SFN signals 825 (e.g., one or more SFN synchronization signals or one or more SFN paging signals). In some examples, transmitting the one or more SFN synchronization signals or one or more SFN paging signals may be based on the RRC connection release message.

In some cases, the RRC connection release message 820 may include CORESET/search space configurations for the serving RNA. In such cases, the serving RNA may share a common CORESET/search space configuration between different SFN areas within the RNA. The time periods for monitoring for SFN synchronization signals may be based on the SFN area identifiers for the SFN areas. In some examples, the CORESET/search space configurations may be hashed using the identifier of the SFN area (e.g., RAN-AC ID).

UE 115-*g* may identify a period for monitoring the one or more SFN paging signals based on the determined identifier of the second SFN area. UE 115-*g* may determine that the second SFN area is included in serving RNA associated with the first SFN area based on comparing the identifier of the second SFN area with a portion of the set of SFN area indicated by the RRC connection release message.

At 830, UE 115-*g* may identify the one or more SFN synchronization signals or one or more SFN paging signals associated with the first SFN area based on receiving the SFN signals 825 associated with the serving SFN area.

In some examples, UE 115-*g* may switch from monitoring for signals associated with the first SFN area to monitoring for signals associated with the serving cell. Additionally or alternatively, UE 115-*g* may switch from monitoring for signals associated with the serving cell to monitoring for signals associated with the first SFN area. The UE 115-*g* may determine whether a reselection condition is satisfied based on identifying the one or more SFN synchronization signals or one or more SFN paging signals.

As part of determining whether a reselection condition is satisfied, the UE 115-*g* may measure a signal strength (or other signal characteristic) of the one or more SFN synchronization signals associated with the serving SFN area, and measure a signal strength (or other signal characteristic) associated with one or more SFN synchronization signals associated with a neighboring SFN area. When the signal strength (or other signal characteristic) of the serving SFN area drops below a first threshold and the signal strength (or other signal characteristic) of a neighboring SFN area exceeds a second threshold, UE 115-*g* may determine that the reselection condition is satisfied. In some cases, the measured signal characteristics may be RSRP. In some cases, the first threshold associated with the serving SFN area is different than the second threshold associated with the neighboring SFN area. In some cases, the first threshold and the second threshold are independent of one another. In some cases, second threshold may be some offset of the first threshold.

At 835, UE 115-*g* may select the second SFN area based on determining whether the reselection condition is satisfied. In some examples, the second SFN area may include a second RAN-AC, a second group of cells defined by the network, or a second TA. In some examples, UE 115-*g* may determine, based on selecting the second SFN area, that the second SFN area is included in an RNA that is different than a serving RNA associated with the first SFN area. This may be an example of the intra-RNA mobility 625. UE 115-*g* may determine an identifier of the second SFN area based on the SFN signals 825 received by the UE 115-*g* that are associated with the second SFN area.

At 840, the UE 115-*f* may determine that the second SFN selected by the UE 115-*f* is in the RNA currently serving the UE 115-*f*. In some cases, when the UE 115-*f* enters the RRC inactive state or the RRC idle state, the base station 105-*f* may transmit a list of SFN area identifiers (e.g., RAN-AC identifiers) that are included in the serving RNA. When the UE 115-*f* receives a SFN signal 825, the UE 115-*f* may determine the identifier of the SFN signal's associated SFN area. The UE 115-*f* may compare the identifier in the SFN signal 825 to the list of identifiers associated with the serving RNA. If the identifier is not on the list, the UE 115-*f* may determine that the SFN signals 825 are associated with a second RNA (e.g., sometimes referred to as a target RNA) that is different than the serving RNA. If the identifier is on the list, the UE 115-*f* may determine that the SFN signals 825 are associated with the serving RNA. In some cases, the RRC connection release message may include a list of PCIDs associated with the serving RNA. Serving cell matching may be based on PCID matching, where cell identity may not be available before SIB decoding.

At 845, the UE 115-*f* may perform the area reselection procedure based on selecting the second SFN area. The area reselection procedure may be an intra-RNA procedure based on the second SFN area being in the serving RNA. To perform an intra-RNA procedure, the UE 115-*g* may begin monitoring for SFN signals 825 associated with the second SFN area based on the SFN area ID or other information included in an RRC message (e.g., RRC connection release message 820).

As described above, the SFN area may be an example of a TA. In such cases, the features described with reference to the process flow 800 may be modified, where needed to facilitate inter-TA mobility procedures.

Figure 9:
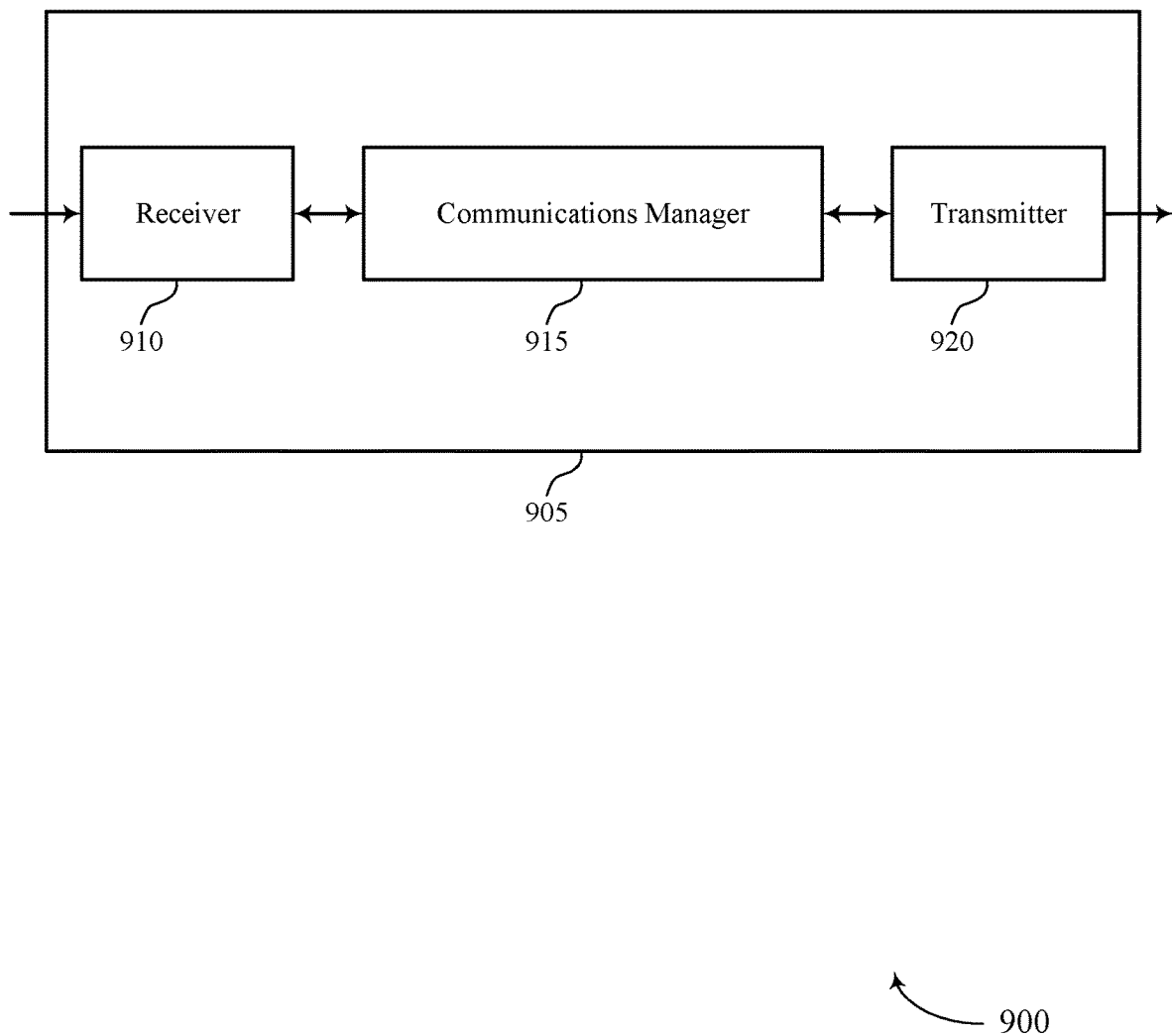
FIGS. 9 and 10 show block diagrams of devices that support mobility procedures with hierarchical mobility in accordance with aspects of the present disclosure.

FIG. 9 shows a block diagram 900 of a device 905 that supports mobility procedures with hierarchical mobility in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to mobility procedures with hierarchical mobility, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify, by a user equipment operating in a radio resource control inactive state or a radio resource control idle state, one or more single-frequency network synchronization signals or one or more single-frequency network paging signals associated with a first single-frequency network area, determine whether a reselection condition is satisfied based on identifying the one or more single-frequency network synchronization signals or the one or more single-frequency network paging signals, select a second single-frequency network area based on determining whether the reselection condition is satisfied, and perform, based on selecting the second single-frequency network area, an area reselection procedure to associate the user equipment with the second single-frequency network area.

The communications manager 915 as described herein may be implemented to realize one or more potential advantages. One implementation may allow the device 905 to save power and increase battery life by communicating with a base station 105 (as shown in FIG. 1) more efficiently. For example, the device 905 may efficiently communicate with a base station 105 when moving between single-frequency network areas, as the device 905 may be able to skip decoding or reading system information. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
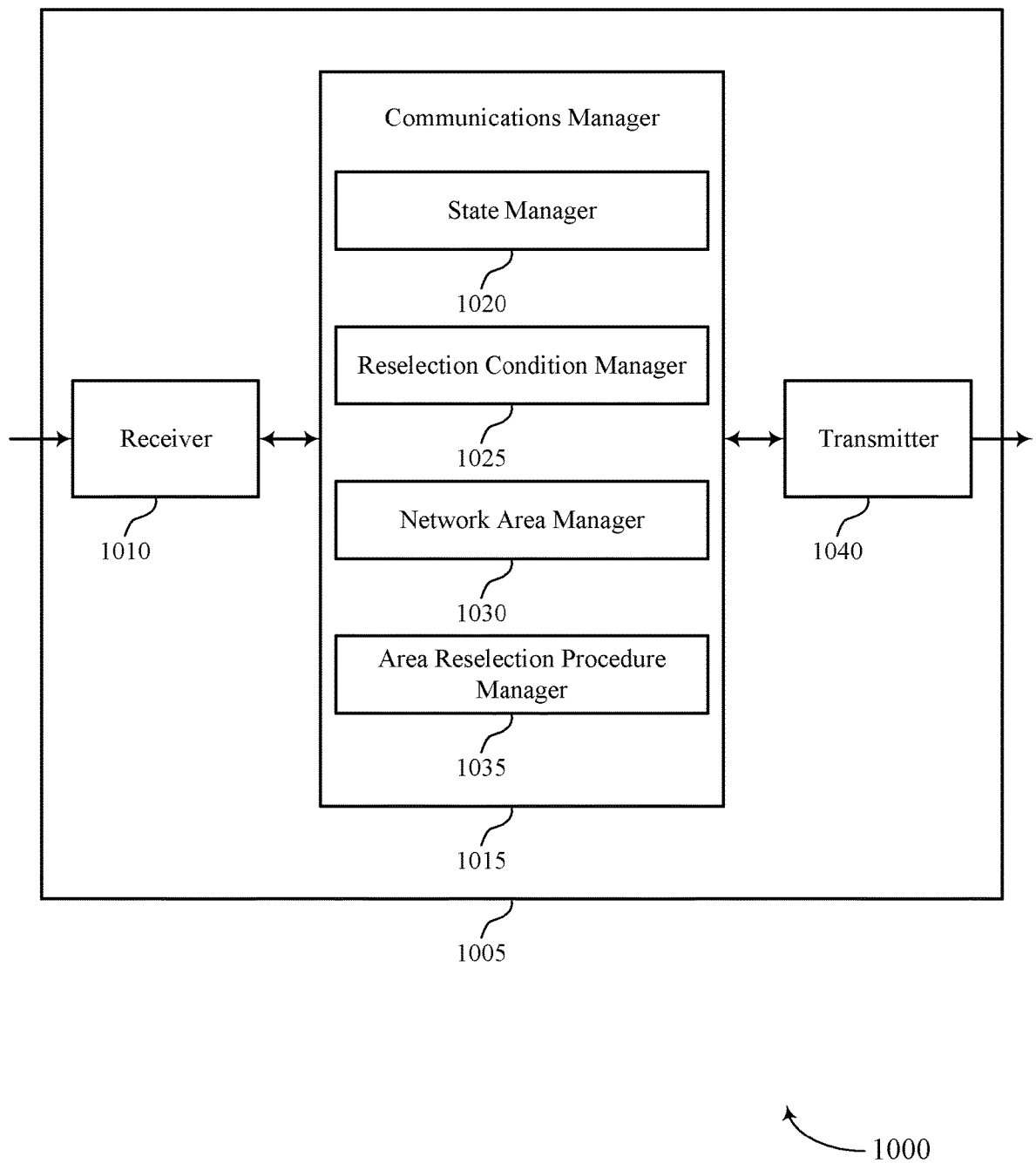

FIG. 10 shows a block diagram 1000 of a device 1005 that supports mobility procedures with hierarchical mobility in accordance with aspects of the present disclosure. The device 1005 may be an example of aspects of a device 905, or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to mobility procedures with hierarchical mobility, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a state manager 1020, a reselection condition manager 1025, a network area manager 1030, and an area reselection procedure manager 1035. The communications manager 1015 may be an example of aspects of the communications manager 1210 described herein.

The state manager 1020 may identify, by a user equipment operating in a radio resource control inactive state or a radio resource control idle state, one or more single-frequency network synchronization signals or one or more single-frequency network paging signals associated with a first single-frequency network area.

The reselection condition manager 1025 may determine whether a reselection condition is satisfied based on identifying the one or more single-frequency network synchronization signals or the one or more single-frequency network paging signals.

The network area manager 1030 may select a second single-frequency network area based on determining whether the reselection condition is satisfied.

The area reselection procedure manager 1035 may perform, based on selecting the second single-frequency network area, an area reselection procedure to associate the user equipment with the second single-frequency network area.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
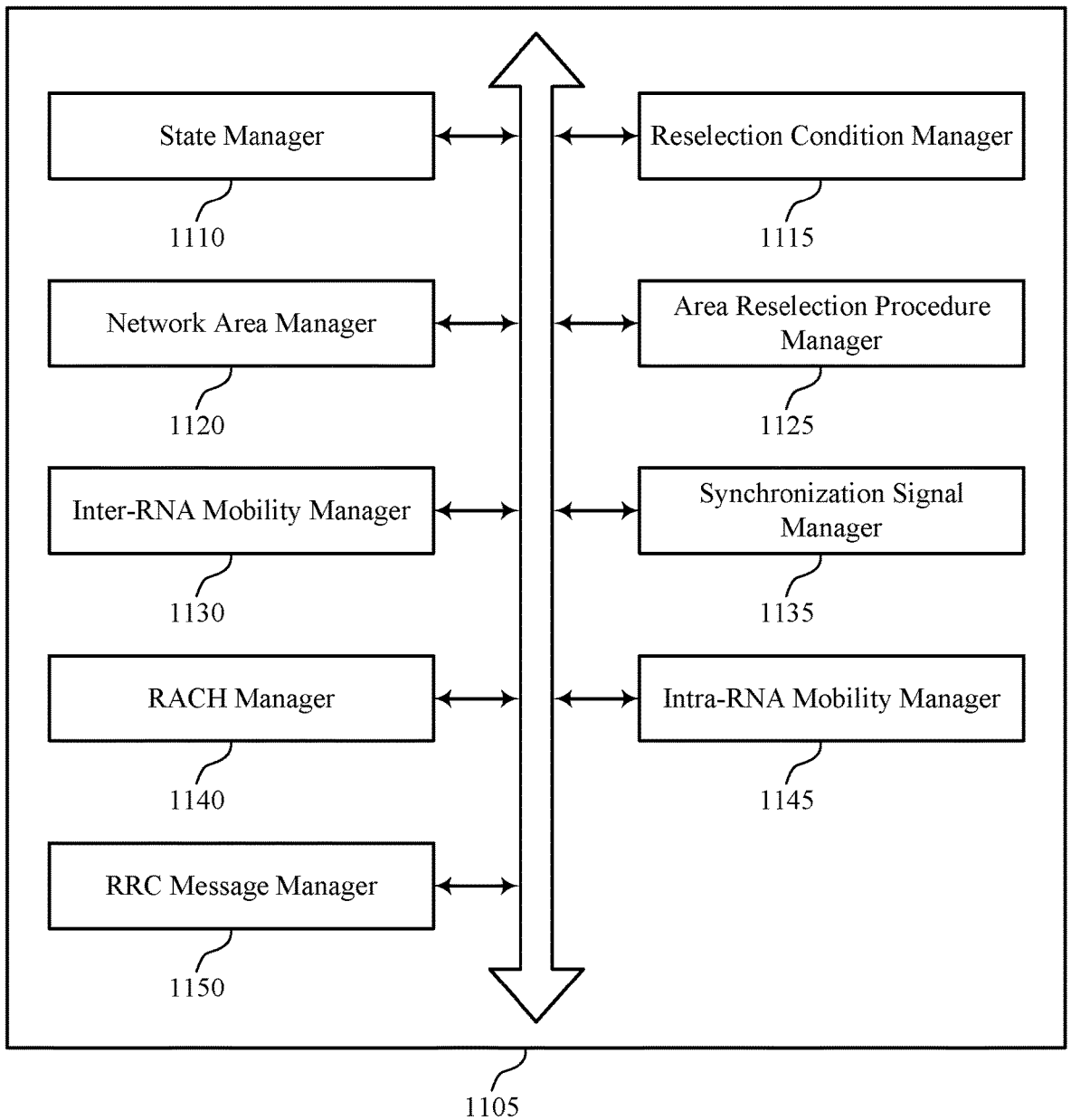
FIG. 11 shows a block diagram of a communications manager that supports mobility procedures with hierarchical mobility in accordance with aspects of the present disclosure.

FIG. 11 shows a block diagram 1100 of a communications manager 1105 that supports mobility procedures with hierarchical mobility in accordance with aspects of the present disclosure. The communications manager 1105 may be an example of aspects of a communications manager 915, a communications manager 1015, or a communications manager 1210 described herein. The communications manager 1105 may include a state manager 1110, a reselection condition manager 1115, a network area manager 1120, an area reselection procedure manager 1125, an inter-RNA mobility manager 1130, a synchronization signal manager 1135, a RACH manager 1140, an intra-RNA mobility manager 1145, and a RRC message manager 1150. Each of these modules may communicate, directly or indirectly, with one another (e.g., via one or more buses).

The state manager 1110 may identify, by a user equipment operating in a radio resource control inactive state or a radio resource control idle state, one or more single-frequency network synchronization signals or one or more single-frequency network paging signals associated with a first single-frequency network area. In some examples, the state manager 1110 may enter, by the user equipment, the radio resource control connected state based on determining that the second single-frequency network area is not included in the serving radio access single-frequency network based notification area, where performing the random access channel procedure is based on entering the radio resource control connected state. In some examples, the state manager 1110 may enter the radio resource control inactive state based on receiving the radio resource control connection release message.

The reselection condition manager 1115 may determine whether a reselection condition is satisfied based on identifying the one or more single-frequency network synchronization signals or the one or more single-frequency network paging signals.

The network area manager 1120 may select a second single-frequency network area based on determining whether the reselection condition is satisfied. In some cases, the first single-frequency network area includes a first radio access single-frequency network area code. In some cases, the second single-frequency network area includes a second radio access single-frequency network area code. In some cases, the first single-frequency network area includes a first group of cells defined by a network entity. In some cases, the second single-frequency network area includes a second first group of cells defined by the network entity. In some cases, the first single-frequency network area includes a first tracking area. In some cases, the second single-frequency network area includes a second tracking area.

The area reselection procedure manager 1125 may perform, based on selecting the second single-frequency network area, an area reselection procedure to associate the user equipment with the second single-frequency network area. In some examples, the area reselection procedure manager 1125 may compare an identifier of the second single-frequency network area with at least a portion of the set indicated by the radio resource control connection release message, where determining that the second single-frequency network area is included in the serving radio access network based notification area is based on comparing the identifier of the second single-frequency network area with at least the portion of the set.

In some examples, the area reselection procedure manager 1125 may determine, based on selecting the second single-frequency network area, whether the second single-frequency network area is included in a serving radio access network based notification area with the first single-frequency network area, where performing the area reselection procedure is based on determining whether the second single-frequency network area is included in the serving radio access network based notification area. In some examples, the area reselection procedure manager 1125 may compare an identifier of the second single-frequency network area with at least a portion of the set indicated by the radio resource control connection release message, where determining whether the second single-frequency network area is included in the serving radio access network based notification area is based on comparing the identifier of the second single-frequency network area with at least the portion of the set.

In some examples, the area reselection procedure manager 1125 may measure a first signal strength of the one or more single-frequency network synchronization signals associated with the first single-frequency network area. In some examples, the area reselection procedure manager 1125 may measure a second signal strength of one or more single-frequency network synchronization signals associated with the second single-frequency network area, where determining whether the reselection condition is satisfied is based on the first signal strength and the second signal strength.

In some examples, the area reselection procedure manager 1125 may identify a serving cell associated with a serving radio access network notification area, where identifying the one or more single-frequency network synchronization signals or the one or more single-frequency network paging signals associated with the first single-frequency network area is based on identifying the serving cell. In some examples, the area reselection procedure manager 1125 may switch from monitoring for signals associated with the first single-frequency network area to monitoring for signals associated with a serving cell, where determining whether the reselection condition is satisfied is based on switching from monitoring for signals associated with the first single-frequency network area to monitoring for signals associated with the serving cell.

In some examples, the area reselection procedure manager 1125 may switch from monitoring for signals associated with a serving cell to monitoring for signals associated with the first single-frequency network area, where determining whether the reselection condition is satisfied is based on switching from monitoring for signals associated with the serving cell to monitoring for signals associated with the first single-frequency network area. In some cases, the area reselection procedure is performed without reading system information.

The inter-RNA mobility manager 1130 may determine, based on selecting the second single-frequency network area, that the second single-frequency network area is not included in a serving radio access network based notification area associated with the first single-frequency network area, where performing the area reselection procedure is based on determining that the second single-frequency network area is not included in the serving radio access network based notification area. In some examples, the inter-RNA mobility manager 1130 may determine, based on selecting the second single-frequency network area, that the second single-frequency network area is included in a target radio access network based notification area different than a serving radio access network based notification area associated with the first single-frequency network area, where performing the area reselection procedure is based on determining that the second single-frequency network area is included in the target radio access network based notification area. In some cases, the area reselection procedure is performed with decoding a system information type 1 block.

The synchronization signal manager 1135 may monitor for one or more primary synchronization signals or one or more secondary synchronization signal associated with the second single-frequency network area based on determining that the second single-frequency network area is not included in the serving radio access network based notification area. In some examples, the synchronization signal manager 1135 may decode a master information block associated with a cell of the second single-frequency network area, where performing the area reselection procedure is based on decoding the master information block. In some cases, the area reselection procedure is performed without decoding a system information type 1 block.

The RACH manager 1140 may perform a random access channel procedure based on the user equipment being in a radio resource control connected state.

The intra-RNA mobility manager 1145 may determine, based on selecting the second single-frequency network area, that the second single-frequency network area is included in a serving radio access network based notification area associated with the first single-frequency network area, where performing the area reselection procedure is based on determining that the second single-frequency network area is included in the serving radio access network based notification area. In some cases, the first single-frequency network area and the second single-frequency network area are within a single radio access network notification area.

The RRC message manager 1150 may receive a radio resource control connection release message that indicates a set of at least one single-frequency network area included in the serving radio access network based notification area. In some examples, the RRC message manager 1150 may receive a radio resource control connection release message that indicates a search space configuration for the one or more single-frequency network paging signals, where monitoring for the one or more single-frequency network paging signals is based on the search space configuration. In some examples, the RRC message manager 1150 may determine an identifier of the second single-frequency network area based on the radio resource control connection release message.

In some examples, the RRC message manager 1150 may identify a period for monitoring the one or more single-frequency network paging signals based on the identifier of the second single-frequency network area. In some examples, the RRC message manager 1150 may receive a radio resource control connection release message that indicates a set of a least one single-frequency network area included in the serving radio access network based notification area. In some examples, the RRC message manager 1150 may receive a radio resource control connection release message that indicates that the area reselection procedure is performed without reading system information.

Figure 12:
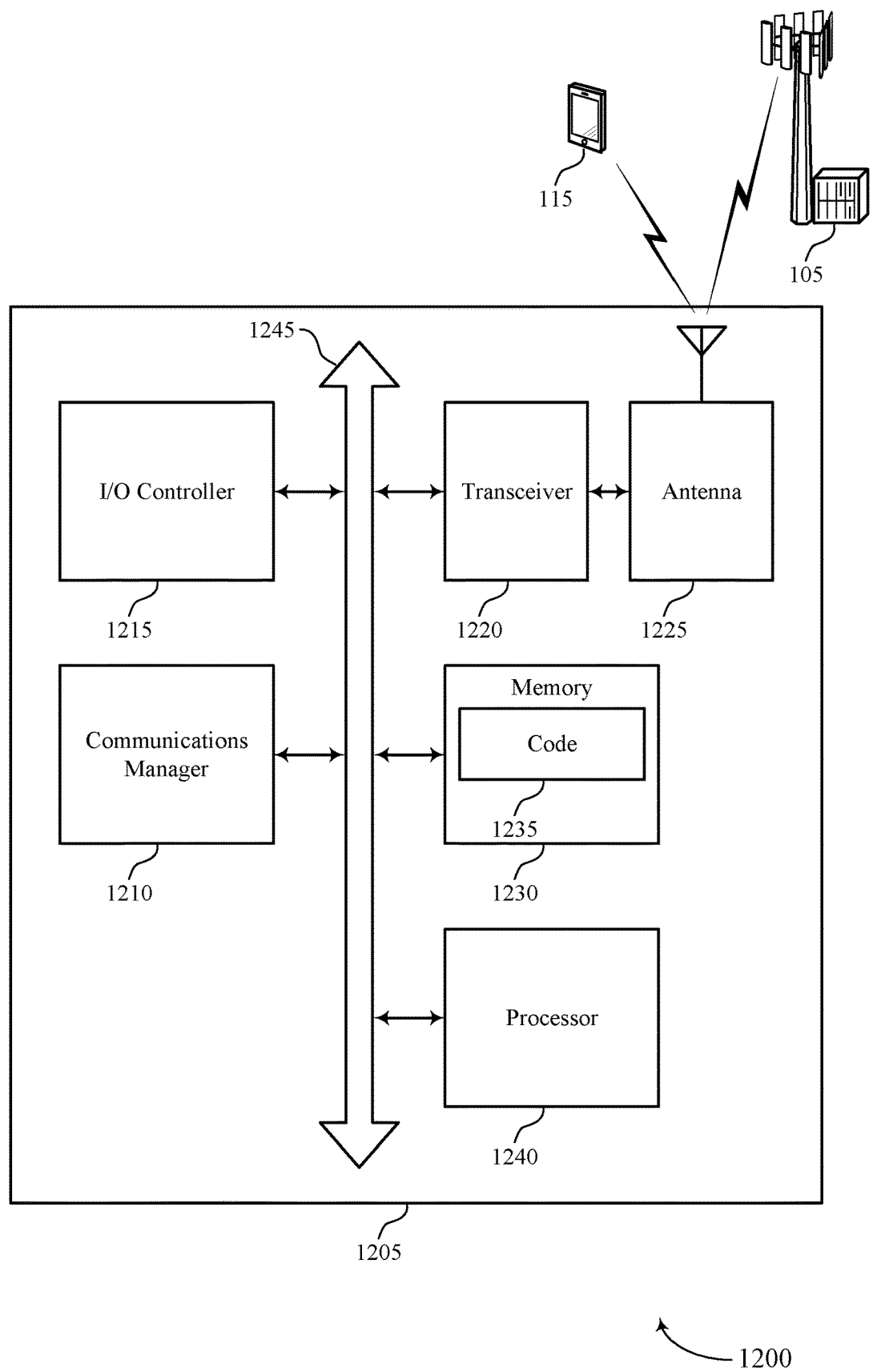
FIG. 12 shows a diagram of a system including a device that supports mobility procedures with hierarchical mobility in accordance with aspects of the present disclosure.

FIG. 12 shows a diagram of a system 1200 including a device 1205 that supports mobility procedures with hierarchical mobility in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may identify, by a user equipment operating in a radio resource control inactive state or a radio resource control idle state, one or more single-frequency network synchronization signals or one or more single-frequency network paging signals associated with a first single-frequency network area, determine whether a reselection condition is satisfied based on identifying the one or more single-frequency network synchronization signals or the one or more single-frequency network paging signals, select a second single-frequency network area based on determining whether the reselection condition is satisfied, and perform, based on selecting the second single-frequency network area, an area reselection procedure to associate the user equipment with the second single-frequency network area.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting mobility procedures with hierarchical mobility).

The processor 1240 of the device 1205 (e.g., controlling the receiver 910, the transmitter 920, or the transceiver 1220) may reduce power consumption and increase communications efficiency based on the mobility procedures described herein. In some examples, the processor 1240 of the device 1205 may reconfigure parameters for moving between single-frequency network areas. For example, the processor 1240 of the device 1205 may turn on one or more processing units for adjusting communication parameters, increase a processing clock, or a similar mechanism within the device 1205. As such, when the device 1205 subsequently moves to a new single-frequency network area, the processor 1240 may be ready to respond more efficiently through the reduction of a ramp up in processing power. The improvements in power saving and mobility procedures may further increase battery life at the device 1205.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
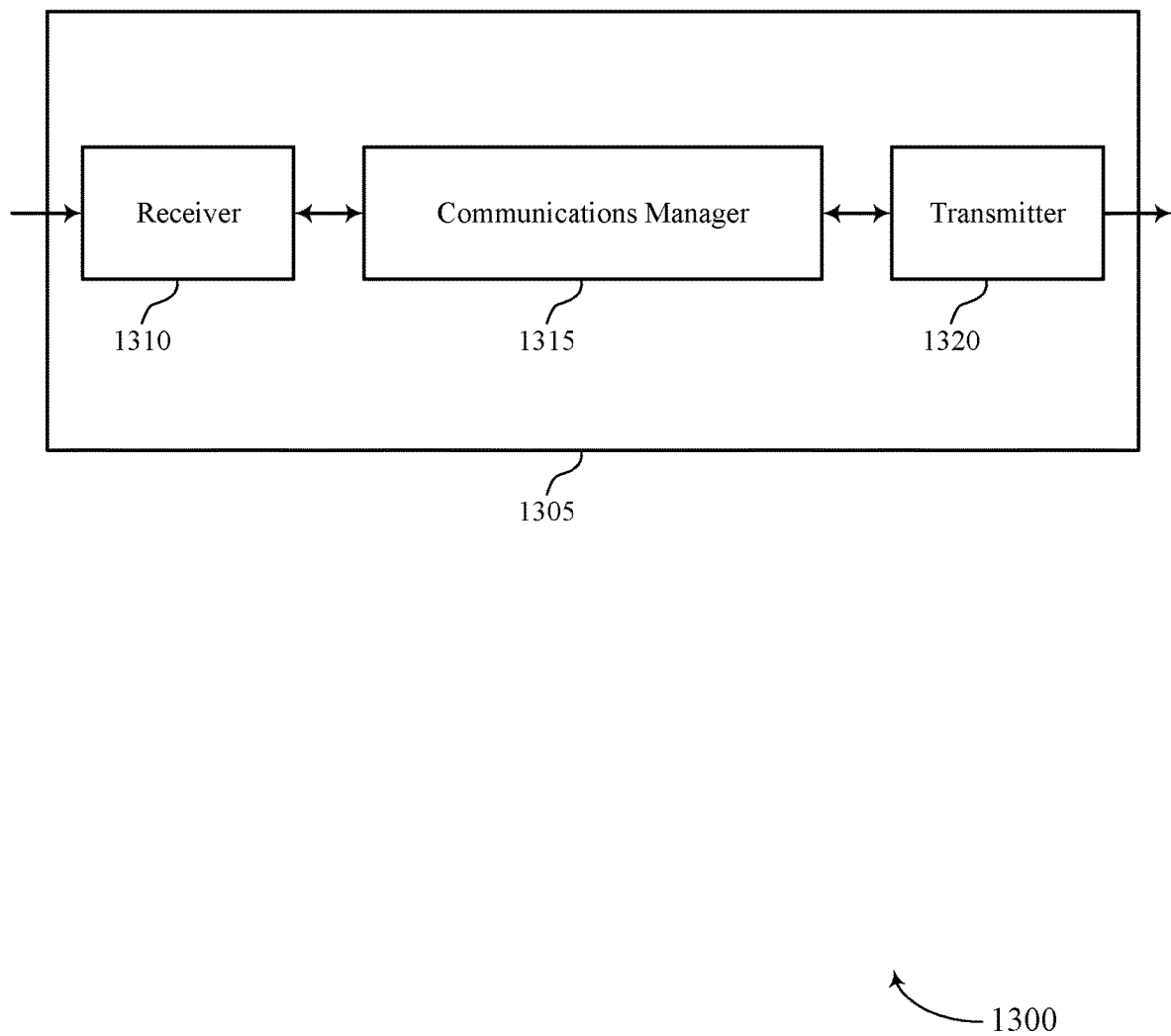
FIGS. 13 and 14 show block diagrams of devices that support mobility procedures with hierarchical mobility in accordance with aspects of the present disclosure.

FIG. 13 shows a block diagram 1300 of a device 1305 that supports mobility procedures with hierarchical mobility in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to mobility procedures with hierarchical mobility, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may identify a single-frequency network area associated with a user equipment operating in a radio resource control inactive state or a radio resource control idle state, identify a service class of the user equipment, select whether an area reselection procedure includes instructions for decoding a system information block based on the single-frequency network area and the service class of the user equipment, and transmit, by a base station, a radio resource control connection release message that indicates whether the area reselection procedure includes decoding the system information block.

The communications manager 1315 as described herein may be implemented to realize one or more potential advantages. One implementation may allow the device 1305 to save power by communicating with a UE 115 (as shown in FIG. 1) more efficiently. For example, the device 1305 may improve reliability in communications with a UE 115, as the device 1305 may be able to identify when the UE 115 moves to a new single-frequency network area and adjust communications accordingly. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
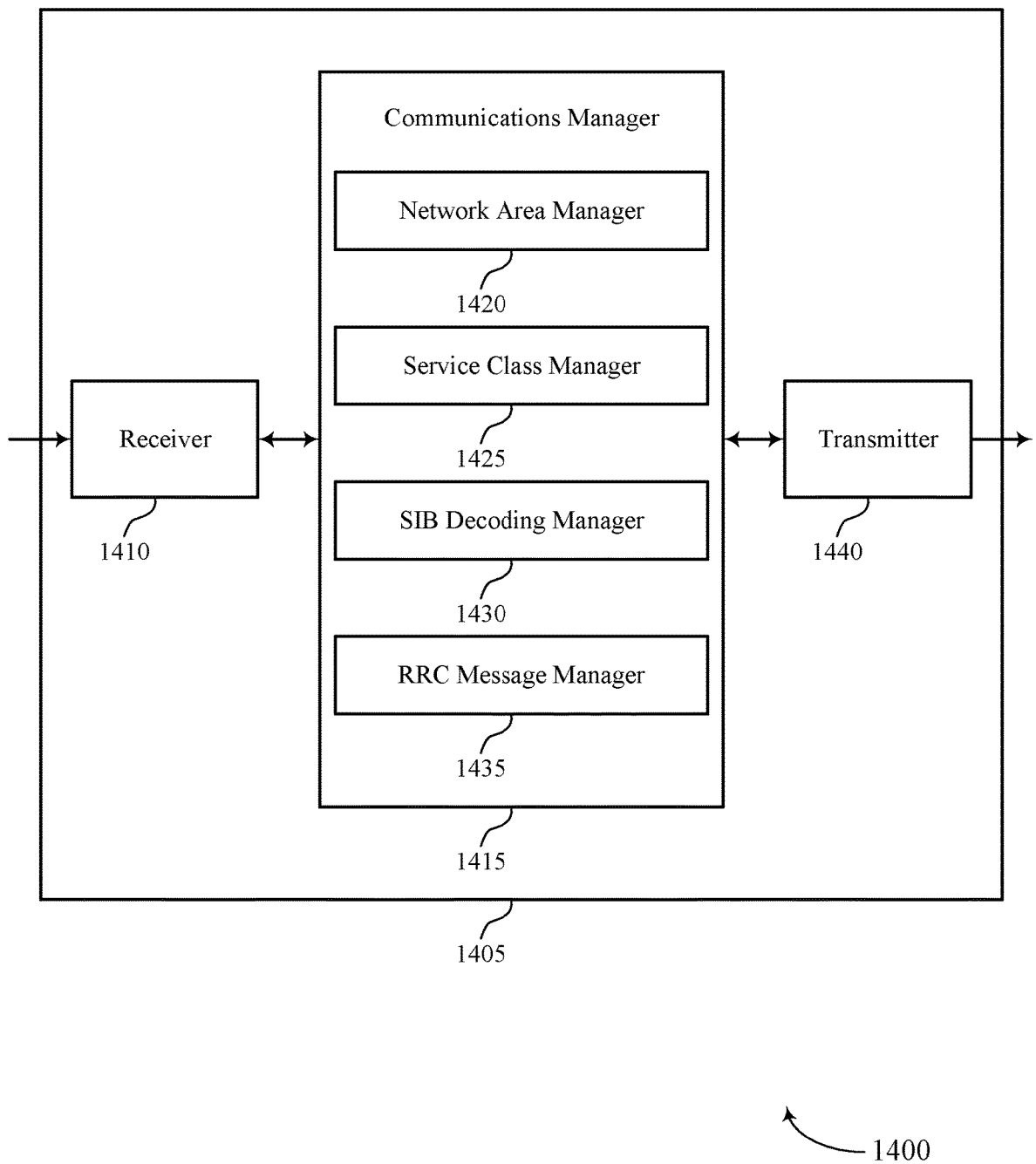

FIG. 14 shows a block diagram 1400 of a device 1405 that supports mobility procedures with hierarchical mobility in accordance with aspects of the present disclosure. The device 1405 may be an example of aspects of a device 1305, or a base station 105 as described herein. The device 1405 may include a receiver 1410, a communications manager 1415, and a transmitter 1440. The device 1405 may also include a processor. Each of these components may be in communication with one another (e.g., via one or more buses).

The receiver 1410 may receive information such as packets, user data, or control information associated with various information channels (e.g., control channels, data channels, and information related to mobility procedures with hierarchical mobility, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a network area manager 1420, a service class manager 1425, a SIB decoding manager 1430, and a RRC message manager 1435. The communications manager 1415 may be an example of aspects of the communications manager 1610 described herein.

The network area manager 1420 may identify a single-frequency network area associated with a user equipment operating in a radio resource control inactive state or a radio resource control idle state.

The service class manager 1425 may identify a service class of the user equipment.

The SIB decoding manager 1430 may select whether an area reselection procedure includes instructions for decoding a system information block based on the single-frequency network area and the service class of the user equipment.

The RRC message manager 1435 may transmit, by a base station, a radio resource control connection release message that indicates whether the area reselection procedure includes decoding the system information block.

The transmitter 1440 may transmit signals generated by other components of the device 1405. In some examples, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

Figure 15:
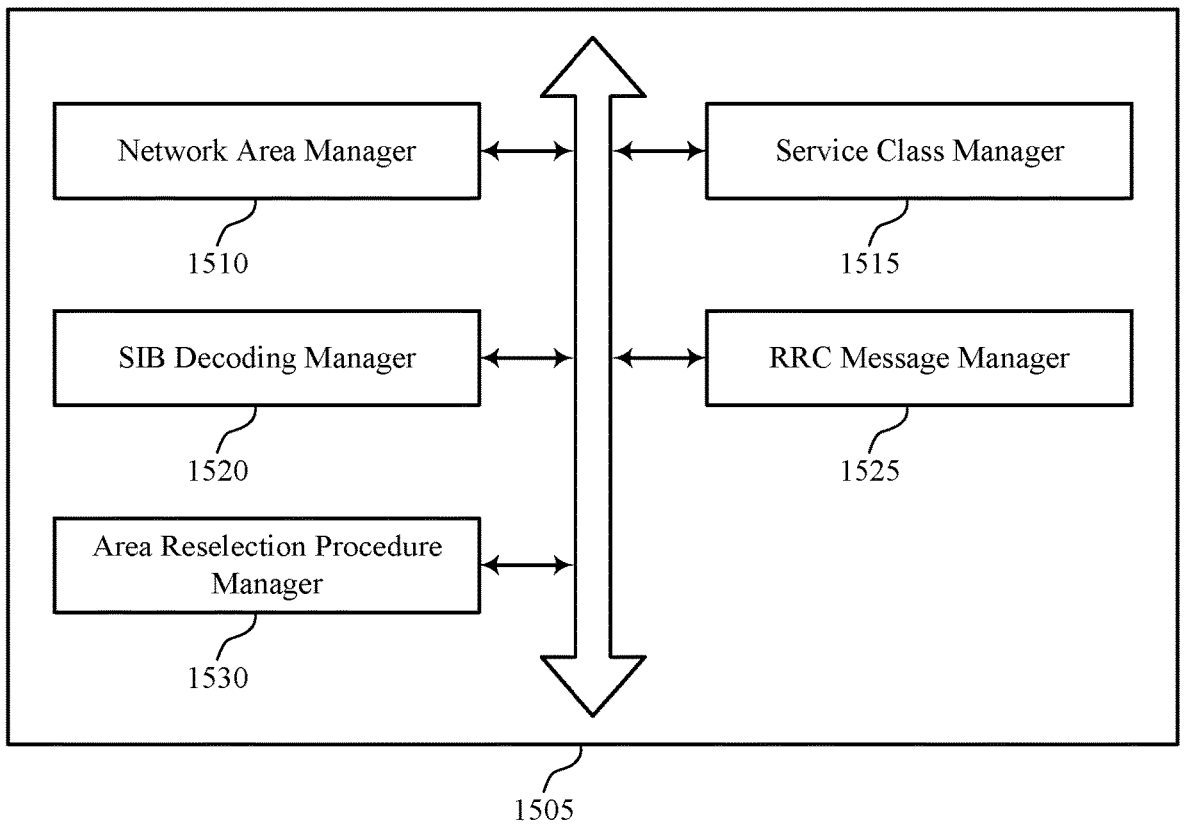
FIG. 15 shows a block diagram of a communications manager that supports mobility procedures with hierarchical mobility in accordance with aspects of the present disclosure.

FIG. 15 shows a block diagram 1500 of a communications manager 1505 that supports mobility procedures with hierarchical mobility in accordance with aspects of the present disclosure. The communications manager 1505 may be an example of aspects of a communications manager 1315, a communications manager 1415, or a communications manager 1610 described herein. The communications manager 1505 may include a network area manager 1510, a service class manager 1515, a SIB decoding manager 1520, a RRC message manager 1525, and an area reselection procedure manager 1530. Each of these modules may communicate, directly or indirectly, with one another (e.g., via one or more buses).

The network area manager 1510 may identify a single-frequency network area associated with a user equipment operating in a radio resource control inactive state or a radio resource control idle state.

The service class manager 1515 may identify a service class of the user equipment. In some cases, the service class of the user equipment includes a performance requirement associated with a signal communicated with the user equipment, a data rate of the signal communicated with the user equipment, a mobility of the user equipment, a latency requirement associated with the signal communicated with the user equipment, a reliability parameter associated with the signal communicated with the user equipment, or a combination thereof.

The SIB decoding manager 1520 may select whether an area reselection procedure includes instructions for decoding a system information block based on the single-frequency network area and the service class of the user equipment. In some cases, the radio resource control connection release message indicates that the area reselection procedure is performed without reading system information. In some cases, the system information block includes a system information type 1 block.

The RRC message manager 1525 may transmit, by a base station, a radio resource control connection release message that indicates whether the area reselection procedure includes decoding the system information block. In some cases, the radio resource control connection release message further indicates a set of at least one radio access network area code included in a serving radio access network based notification area associated with the user equipment, where transmitting the one or more single-frequency network synchronization signals or the one or more single-frequency network paging signals is based on the radio resource control connection release message including the set. In some cases, the radio resource control connection release message further indicates a search space configuration for the one or more single-frequency network paging signals associated with the single-frequency network area, where transmitting the one or more single-frequency network paging signals is based on the radio resource control connection release message including the search space configuration.

The area reselection procedure manager 1530 may transmit, by the base station, one or more single-frequency network synchronization signals or one or more single-frequency network paging signals within the single-frequency network area based on the single-frequency network area.

Figure 16:
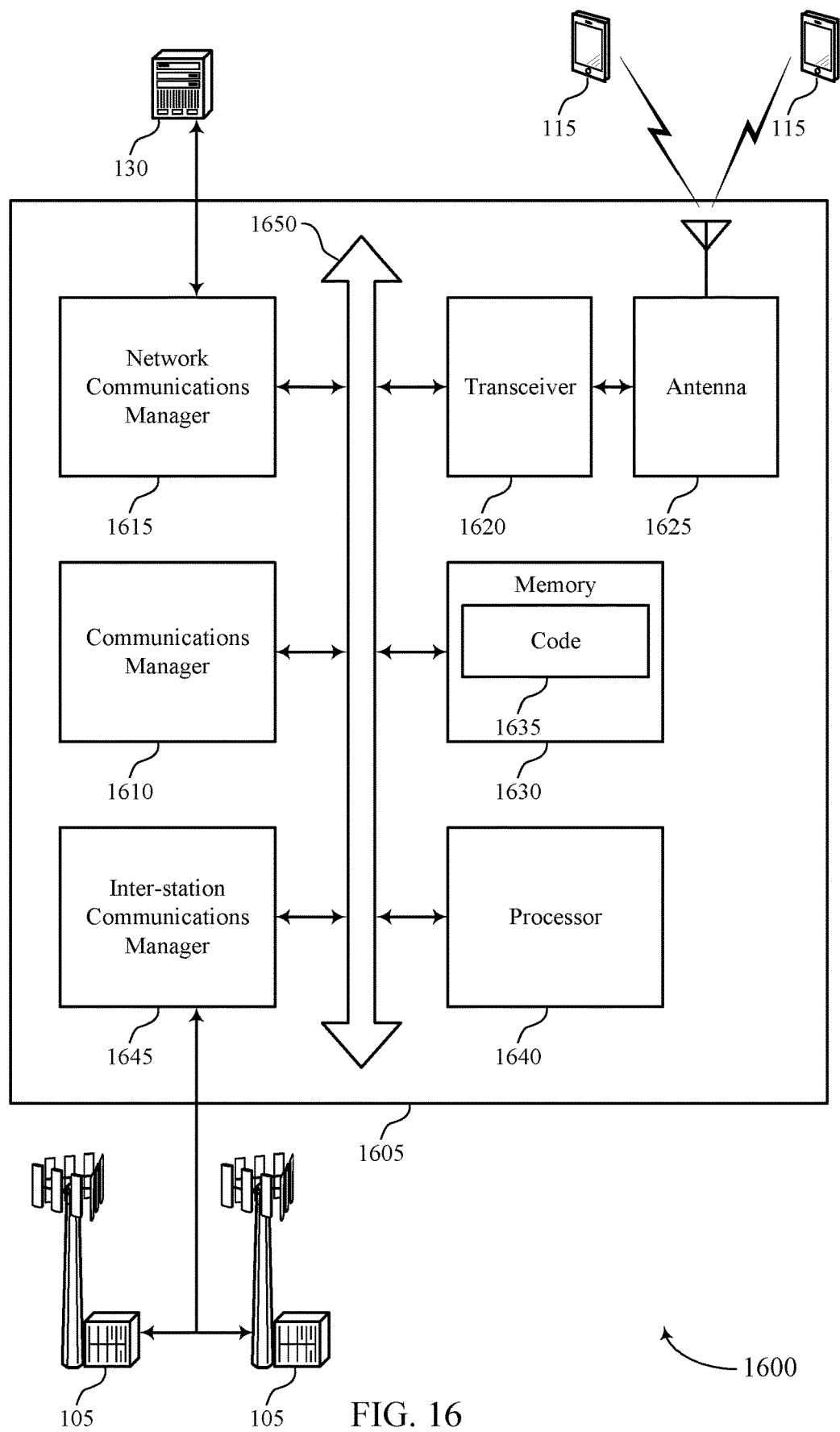
FIG. 16 shows a diagram of a system including a device that supports mobility procedures with hierarchical mobility in accordance with aspects of the present disclosure.

FIG. 16 shows a diagram of a system 1600 including a device 1605 that supports mobility procedures with hierarchical mobility in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may identify a single-frequency network area associated with a user equipment operating in a radio resource control inactive state or a radio resource control idle state, identify a service class of the user equipment, select whether an area reselection procedure includes instructions for decoding a system information block based on the single-frequency network area and the service class of the user equipment, and transmit, by a base station, a radio resource control connection release message that indicates whether the area reselection procedure includes decoding the system information block.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In other cases, a memory controller may be integrated into processor 1640. The processor 1640 may be configured to execute computer-readable instructions stored in a memory (e.g., the memory 1630) to cause the device 1605 to perform various functions (e.g., functions or tasks supporting mobility procedures with hierarchical mobility).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
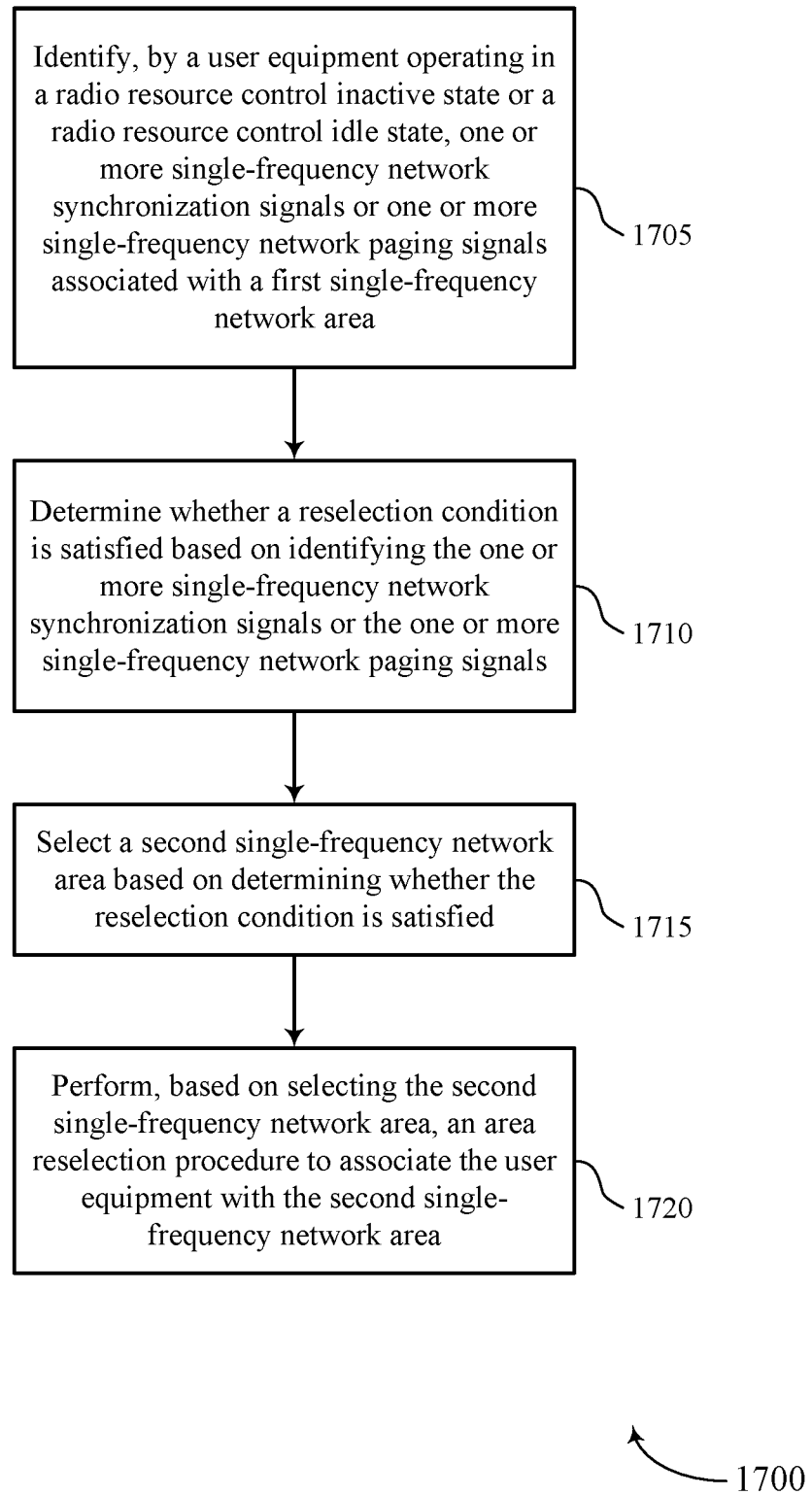
FIGS. 17 through 21 show flowcharts illustrating methods that support mobility procedures with hierarchical mobility in accordance with aspects of the present disclosure.

FIG. 17 shows a flowchart illustrating a method 1700 that supports mobility procedures with hierarchical mobility in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may identify, by a user equipment operating in a radio resource control inactive state or a radio resource control idle state, one or more single-frequency network synchronization signals or one or more single-frequency network paging signals associated with a first single-frequency network area. The operations of 1705 may be performed according to the methods described herein. In some examples, aspects of the operations of 1705 may be performed by a state manager as described with reference to FIGS. 9 through 12.

At 1710, the UE may determine whether a reselection condition is satisfied based on identifying the one or more single-frequency network synchronization signals or the one or more single-frequency network paging signals. The operations of 1710 may be performed according to the methods described herein. In some examples, aspects of the operations of 1710 may be performed by a reselection condition manager as described with reference to FIGS. 9 through 12.

At 1715, the UE may select a second single-frequency network area based on determining whether the reselection condition is satisfied. The operations of 1715 may be performed according to the methods described herein. In some examples, aspects of the operations of 1715 may be performed by a network area manager as described with reference to FIGS. 9 through 12.

At 1720, the UE may perform, based on selecting the second single-frequency network area, an area reselection procedure to associate the user equipment with the second single-frequency network area. The operations of 1720 may be performed according to the methods described herein. In some examples, aspects of the operations of 1720 may be performed by an area reselection procedure manager as described with reference to FIGS. 9 through 12.

Figure 18:
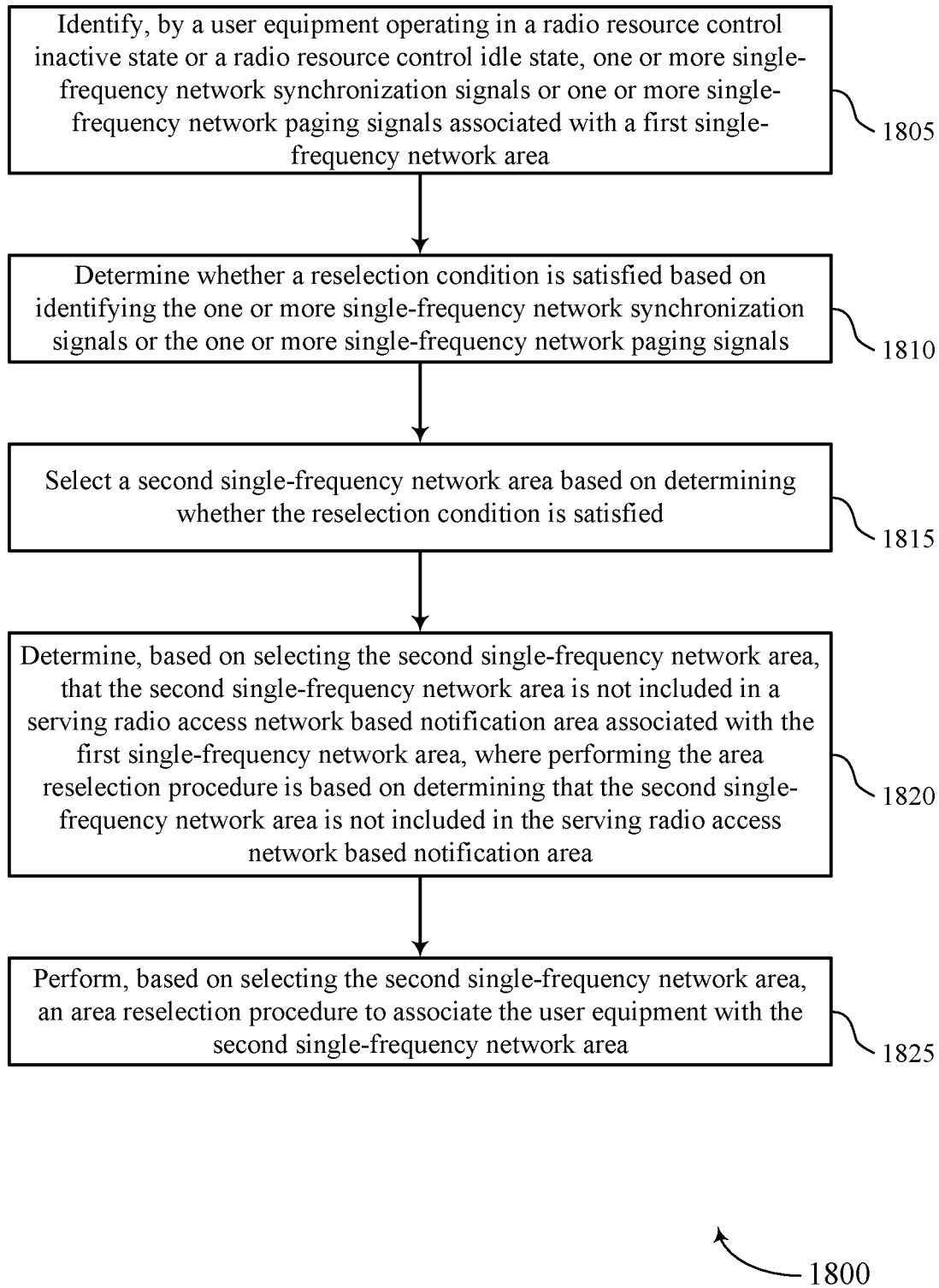

FIG. 18 shows a flowchart illustrating a method 1800 that supports mobility procedures with hierarchical mobility in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may identify, by a user equipment operating in a radio resource control inactive state or a radio resource control idle state, one or more single-frequency network synchronization signals or one or more single-frequency network paging signals associated with a first single-frequency network area. The operations of 1805 may be performed according to the methods described herein. In some examples, aspects of the operations of 1805 may be performed by a state manager as described with reference to FIGS. 9 through 12.

At 1810, the UE may determine whether a reselection condition is satisfied based on identifying the one or more single-frequency network synchronization signals or the one or more single-frequency network paging signals. The operations of 1810 may be performed according to the methods described herein. In some examples, aspects of the operations of 1810 may be performed by a reselection condition manager as described with reference to FIGS. 9 through 12.

At 1815, the UE may select a second single-frequency network area based on determining whether the reselection condition is satisfied. The operations of 1815 may be performed according to the methods described herein. In some examples, aspects of the operations of 1815 may be performed by a network area manager as described with reference to FIGS. 9 through 12.

At 1820, the UE may determine, based on selecting the second single-frequency network area, that the second single-frequency network area is not included in a serving radio access network based notification area associated with the first single-frequency network area, where performing the area reselection procedure is based on determining that the second single-frequency network area is not included in the serving radio access network based notification area. The operations of 1820 may be performed according to the methods described herein. In some examples, aspects of the operations of 1820 may be performed by an inter-RNA mobility manager as described with reference to FIGS. 9 through 12.

At 1825, the UE may perform, based on selecting the second single-frequency network area, an area reselection procedure to associate the user equipment with the second single-frequency network area. The operations of 1825 may be performed according to the methods described herein. In some examples, aspects of the operations of 1825 may be performed by an area reselection procedure manager as described with reference to FIGS. 9 through 12.

Figure 19:
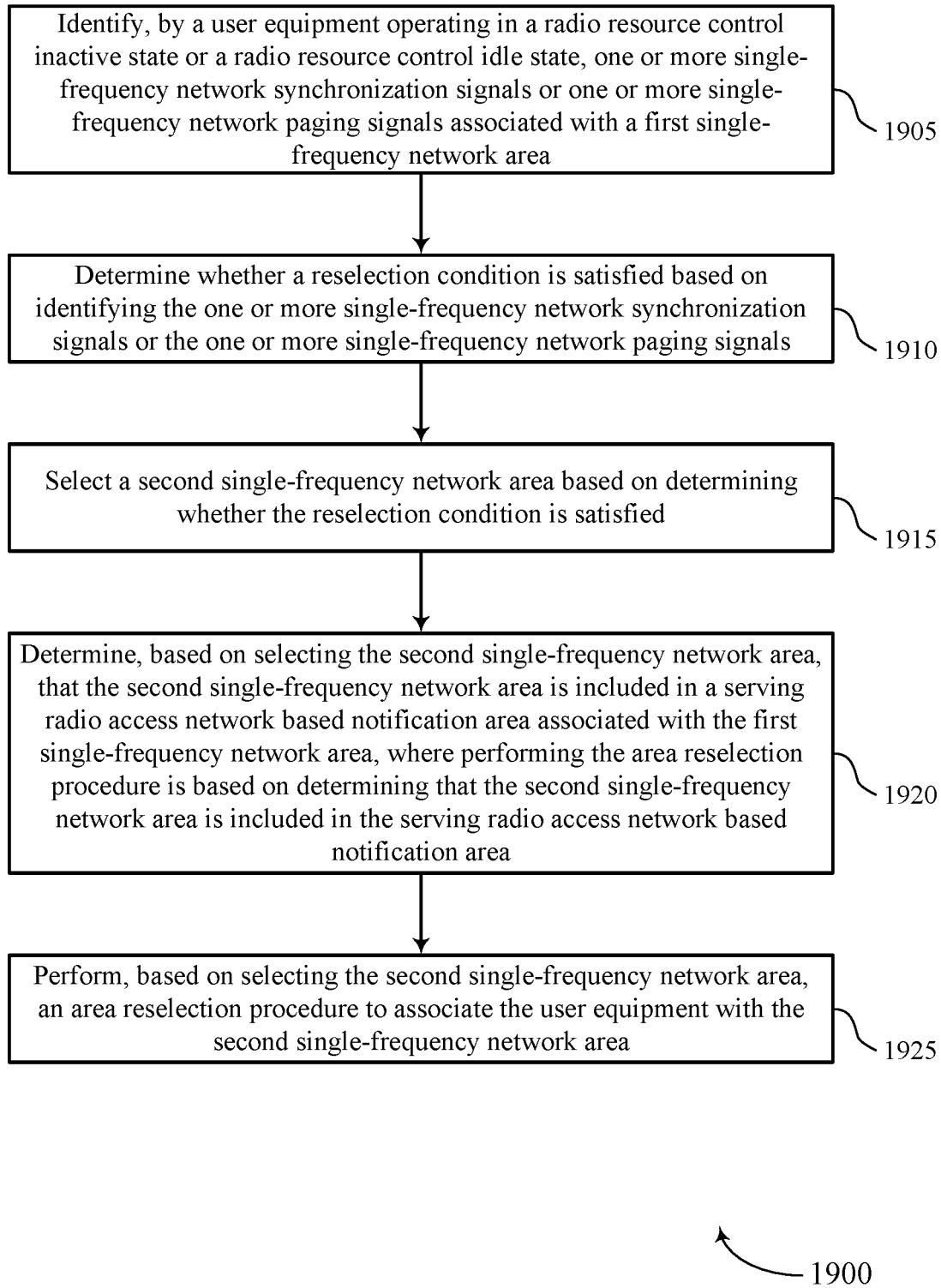

FIG. 19 shows a flowchart illustrating a method 1900 that supports mobility procedures with hierarchical mobility in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may identify, by a user equipment operating in a radio resource control inactive state or a radio resource control idle state, one or more single-frequency network synchronization signals or one or more single-frequency network paging signals associated with a first single-frequency network area. The operations of 1905 may be performed according to the methods described herein. In some examples, aspects of the operations of 1905 may be performed by a state manager as described with reference to FIGS. 9 through 12.

At 1910, the UE may determine whether a reselection condition is satisfied based on identifying the one or more single-frequency network synchronization signals or the one or more single-frequency network paging signals. The operations of 1910 may be performed according to the methods described herein. In some examples, aspects of the operations of 1910 may be performed by a reselection condition manager as described with reference to FIGS. 9 through 12.

At 1915, the UE may select a second single-frequency network area based on determining whether the reselection condition is satisfied. The operations of 1915 may be performed according to the methods described herein. In some examples, aspects of the operations of 1915 may be performed by a network area manager as described with reference to FIGS. 9 through 12.

At 1920, the UE may determine, based on selecting the second single-frequency network area, that the second single-frequency network area is included in a serving radio access network based notification area associated with the first single-frequency network area, where performing the area reselection procedure is based on determining that the second single-frequency network area is included in the serving radio access network based notification area. The operations of 1920 may be performed according to the methods described herein. In some examples, aspects of the operations of 1920 may be performed by an intra-RNA mobility manager as described with reference to FIGS. 9 through 12.

At 1925, the UE may perform, based on selecting the second single-frequency network area, an area reselection procedure to associate the user equipment with the second single-frequency network area. The operations of 1925 may be performed according to the methods described herein. In some examples, aspects of the operations of 1925 may be performed by an area reselection procedure manager as described with reference to FIGS. 9 through 12.

Figure 20:
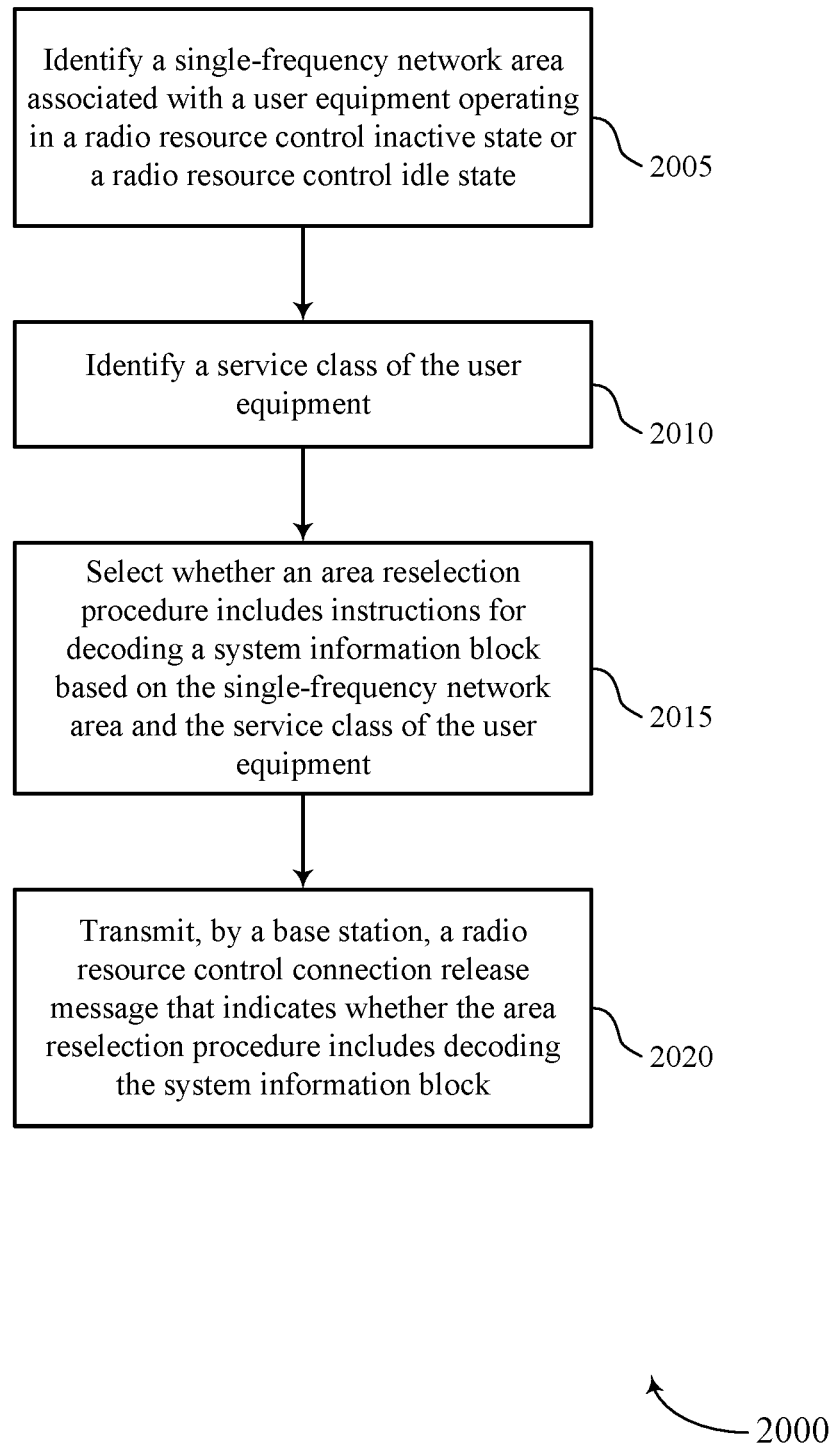

FIG. 20 shows a flowchart illustrating a method 2000 that supports mobility procedures with hierarchical mobility in accordance with aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2005, the base station may identify a single-frequency network area associated with a user equipment operating in a radio resource control inactive state or a radio resource control idle state. The operations of 2005 may be performed according to the methods described herein. In some examples, aspects of the operations of 2005 may be performed by a network area manager as described with reference to FIGS. 13 through 16.

At 2010, the base station may identify a service class of the user equipment. The operations of 2010 may be performed according to the methods described herein. In some examples, aspects of the operations of 2010 may be performed by a service class manager as described with reference to FIGS. 13 through 16.

At 2015, the base station may select whether an area reselection procedure includes instructions for decoding a system information block based on the single-frequency network area and the service class of the user equipment. The operations of 2015 may be performed according to the methods described herein. In some examples, aspects of the operations of 2015 may be performed by a SIB decoding manager as described with reference to FIGS. 13 through 16.

At 2020, the base station may transmit, by a base station, a radio resource control connection release message that indicates whether the area reselection procedure includes decoding the system information block. The operations of 2020 may be performed according to the methods described herein. In some examples, aspects of the operations of 2020 may be performed by an RRC message manager as described with reference to FIGS. 13 through 16.

Figure 21:
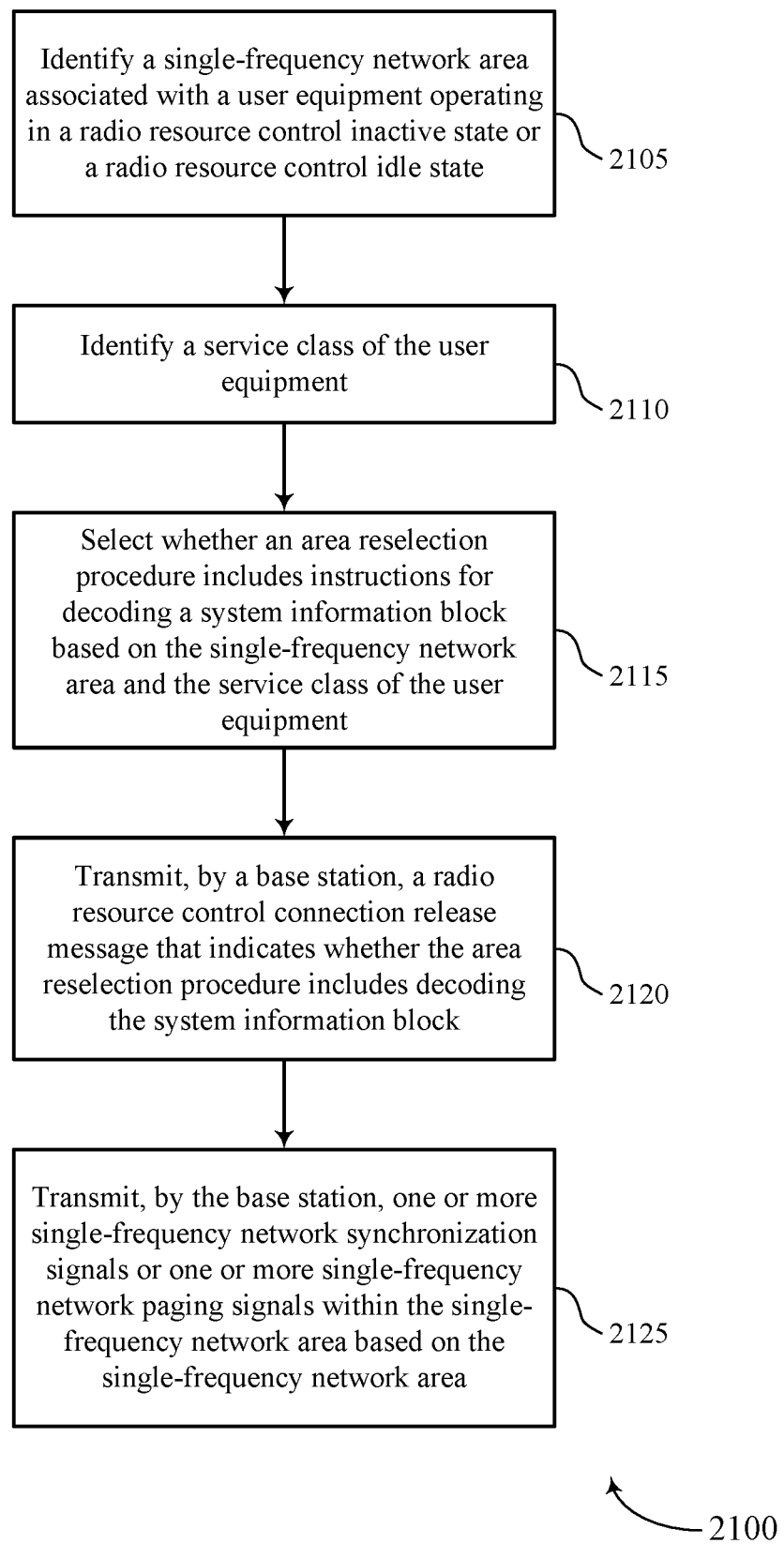

FIG. 21 shows a flowchart illustrating a method 2100 that supports mobility procedures with hierarchical mobility in accordance with aspects of the present disclosure. The operations of method 2100 may be implemented by a base station 105 or its components as described herein. For example, the operations of method 2100 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2105, the base station may identify a single-frequency network area associated with a user equipment operating in a radio resource control inactive state or a radio resource control idle state. The operations of 2105 may be performed according to the methods described herein. In some examples, aspects of the operations of 2105 may be performed by a network area manager as described with reference to FIGS. 13 through 16.

At 2110, the base station may identify a service class of the user equipment. The operations of 2110 may be performed according to the methods described herein. In some examples, aspects of the operations of 2110 may be performed by a service class manager as described with reference to FIGS. 13 through 16.

At 2115, the base station may select whether an area reselection procedure includes instructions for decoding a system information block based on the single-frequency network area and the service class of the user equipment. The operations of 2115 may be performed according to the methods described herein. In some examples, aspects of the operations of 2115 may be performed by a SIB decoding manager as described with reference to FIGS. 13 through 16.

At 2120, the base station may transmit, by a base station, a radio resource control connection release message that indicates whether the area reselection procedure includes decoding the system information block. The operations of 2120 may be performed according to the methods described herein. In some examples, aspects of the operations of 2120 may be performed by an RRC message manager as described with reference to FIGS. 13 through 16.

At 2125, the base station may transmit, by the base station, one or more single-frequency network synchronization signals or one or more single-frequency network paging signals within the single-frequency network area based on the single-frequency network area. The operations of 2125 may be performed according to the methods described herein. In some examples, aspects of the operations of 2125 may be performed by an area reselection procedure manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving a radio resource control connection release message that indicates a set of at least one single-frequency network area included in a serving radio access network-based notification area;

identifying, by a user equipment operating in a radio resource control inactive state or a radio resource control idle state, one or more single-frequency network synchronization signals or one or more single-frequency network paging signals associated with a first single-frequency network area;

determining whether a reselection condition is satisfied based at least in part on identifying the one or more single-frequency network synchronization signals or the one or more single-frequency network paging signals, wherein the reselection condition comprises a first threshold associated with the first single-frequency network area and a second threshold associated with a second single-frequency network area;

selecting the second single-frequency network area based at least in part on determining whether the reselection condition is satisfied; and performing, based at least in part on selecting the second single-frequency network area, an area reselection procedure to associate the user equipment with the second single-frequency network area.

2. The method of claim 1, further comprising:
determining, based at least in part on selecting the second single-frequency network area, that the second single-frequency network area is not included in the serving radio access network-based notification area associated with the first single-frequency network area, wherein performing the area reselection procedure is based at least in part on determining that the second single-frequency network area is not included in the serving radio access network-based notification area.

3. The method of claim 2, further comprising:
monitoring for one or more primary synchronization signals or one or more secondary synchronization signal associated with the second single-frequency network area based at least in part on determining that the second single-frequency network area is not included in the serving radio access network-based notification area; and
decoding a master information block associated with a cell of the second single-frequency network area, wherein performing the area reselection procedure is based at least in part on decoding the master information block.

4. The method of claim 3, wherein the area reselection procedure is performed with or without decoding a system information type 1 block.

5. The method of claim 2, wherein performing the area reselection procedure further comprises:
performing a random access channel procedure based at least in part on the user equipment being in a radio resource control connected state.

6. The method of claim 5, further comprising:
entering, by the user equipment, the radio resource control connected state based at least in part on determining that the second single-frequency network area is not included in the serving radio access network-based notification area, wherein performing the random access channel procedure is based at least in part on entering the radio resource control connected state.

7. The method of claim 1, wherein:
the first single-frequency network area comprises a first radio access network area code, a first group of cells defined by a network entity, a first tracking area, or any combination thereof; and the second single-frequency network area comprises a second radio access network area code, a second group of cells defined by the network entity, a second tracking area, or any combination thereof.

8. The method of claim 1, wherein the first single-frequency network area and the second single-frequency network area are within a single radio access network notification area.

9. The method of claim 1, further comprising:
determining, based at least in part on selecting the second single-frequency network area, that the second single-frequency network area is included in the serving radio access network-based notification area associated with the first single-frequency network area, wherein performing the area reselection procedure is based at least in part on determining that the second single-frequency network area is included in the serving radio access network-based notification area.

10. The method of claim 9, further comprising:
comparing an identifier of the second single-frequency network area with at least a portion of the set indicated by the radio resource control connection release message, wherein determining that the second single-frequency network area is included in the serving radio access network-based notification area is based at least in part on comparing the identifier of the second single-frequency network area with at least the portion of the set.

11. The method of claim 10, wherein the area reselection procedure is performed without reading system information.

12. The method of claim 9, wherein the radio resource control connection release message indicates a search space configuration for the one or more single-frequency network paging signals, wherein monitoring for the one or more single-frequency network paging signals is based at least in part on the search space configuration.

13. The method of claim 12, further comprising:
determining an identifier of the second single-frequency network area based at least in part on the radio resource control connection release message; and
identifying a period for monitoring the one or more single-frequency network paging signals based at least in part on the identifier of the second single-frequency network area.

14. The method of claim 1, further comprising:
determining, based at least in part on selecting the second single-frequency network area, whether the second single-frequency network area is included in the serving radio access network-based notification area with the first single-frequency network area, wherein performing the area reselection procedure is based at least in part on determining whether the second single-frequency network area is included in the serving radio access network-based notification area.

15. The method of claim 14, further comprising:
entering the radio resource control inactive state based at least in part on receiving the radio resource control connection release message; and
comparing an identifier of the second single-frequency network area with at least a portion of the set indicated by the radio resource control connection release message, wherein determining whether the second single-frequency network area is included in the serving radio access network-based notification area is based at least in part on comparing the identifier of the second single-frequency network area with at least the portion of the set.

16. The method of claim 1, wherein the radio resource control connection release message indicates that the area reselection procedure is performed without reading system information.

17. The method of claim 1, further comprising:
measuring a first signal strength of the one or more single-frequency network synchronization signals associated with the first single-frequency network area; and
measuring a second signal strength of one or more single-frequency network synchronization signals associated with the second single-frequency network area, wherein determining whether the reselection condition is satisfied is based at least in part on the first signal strength and the second signal strength.

18. The method of claim 1, further comprising:
identifying a serving cell associated with the serving radio access network-based notification area, wherein identifying the one or more single-frequency network synchronization signals or the one or more single-frequency network paging signals associated with the first single-frequency network area is based at least in part on identifying the serving cell.

19. The method of claim 1, further comprising:
switching from monitoring for signals associated with the first single-frequency network area to monitoring for signals associated with a serving cell, wherein determining whether the reselection condition is satisfied is based at least in part on switching from monitoring for signals associated with the first single-frequency network area to monitoring for signals associated with the serving cell.

20. The method of claim 1, further comprising:
switching from monitoring for signals associated with a serving cell to monitoring for signals associated with the first single-frequency network area, wherein determining whether the reselection condition is satisfied is based at least in part on switching from monitoring for signals associated with the serving cell to monitoring for signals associated with the first single-frequency network area.

21. The method of claim 1, further comprising:
determining, based at least in part on selecting the second single-frequency network area, that the second single-frequency network area is included in a target radio access network based notification area different than the serving radio access network-based notification area associated with the first single-frequency network area, wherein performing the area reselection procedure is based at least in part on determining that the second single-frequency network area is included in the target radio access network based notification area.

22. A method for wireless communication, comprising:
identifying a single-frequency network area associated with a user equipment operating in a radio resource control inactive state or a radio resource control idle state;
identifying a service class of the user equipment;
selecting whether an area reselection procedure includes instructions for decoding a system information block based at least in part on the single-frequency network area and the service class of the user equipment; and
transmitting, by a base station, a radio resource control connection release message that comprises an indication of whether the area reselection procedure includes decoding the system information block.

23. The method of claim 22, wherein the radio resource control connection release message indicates that the area reselection procedure is performed without reading system information.

24. The method of claim 22, further comprising:
transmitting, by the base station, one or more single-frequency network synchronization signals or one or more single-frequency network paging signals within the single-frequency network area based at least in part on the single-frequency network area.

25. The method of claim 24, wherein the radio resource control connection release message further indicates a set of at least one radio access network area code included in a serving radio access network based notification area associated with the user equipment, wherein transmitting the one or more single-frequency network synchronization signals or the one or more single-frequency network paging signals is based at least in part on the radio resource control connection release message indicating the set.

26. The method of claim 24, wherein the radio resource control connection release message further indicates a search space configuration for the one or more single-frequency network paging signals associated with the single-frequency network area, wherein transmitting the one or more single-frequency network paging signals is based at least in part on the radio resource control connection release message including the search space configuration.

27. The method of claim 22, wherein the service class of the user equipment comprises a performance requirement associated with a signal communicated with the user equipment, a data rate of the signal communicated with the user equipment, a mobility of the user equipment, a latency requirement associated with the signal communicated with the user equipment, a reliability parameter associated with the signal communicated with the user equipment, or any combination thereof.

28. The method of claim 22, wherein the single-frequency network area comprises a radio access network area code, a group of cells defined by a network entity, a tracking area, or any combination thereof.

29. An apparatus for wireless communication, comprising:
a processor,
memory in electronic communication with the processor; and
instructions stored in the memory and executable by the processor to cause the apparatus to:
receive a radio resource control connection release message that indicates a set of at least one single-frequency network area included in a serving radio access network-based notification area;
identify, by a user equipment operating in a radio resource control inactive state or a radio resource control idle state, one or more single-frequency network synchronization signals or one or more single-frequency network paging signals associated with a first single-frequency network area;
determine whether a reselection condition is satisfied based at least in part on identifying the one or more single-frequency network synchronization signals or the one or more single-frequency network paging signals, wherein the reselection condition comprises a first threshold associated with the first single-frequency network area and a second threshold associated with a second single-frequency network area;

select the second single-frequency network area based at least in part on determining whether the reselection condition is satisfied; and perform, based at least in part on selecting the second single-frequency network area, an area reselection procedure to associate the user equipment with the second single-frequency network area.

30. An apparatus for wireless communication, comprising:

a processor;

memory in electronic communication with the processor; and instructions stored in the memory and executable by the processor to cause the apparatus to:

identify a single-frequency network area associated with a user equipment operating in a radio resource control inactive state or a radio resource control idle state;

identify a service class of the user equipment;

select whether an area reselection procedure includes instructions for decoding a system information block based at least in part on the single-frequency network area and the service class of the user equipment; and transmit, by a base station, a radio resource control connection release message that comprises an indication of whether the area reselection procedure includes decoding the system information block.

* * * * *